United States Patent [19]  [11] 4,288,326
Keefer  [45] Sep. 8, 1981

[54] ROTARY SHAFT DRIVEN REVERSE OSMOSIS METHOD AND APPARATUS

[76] Inventor: Bowie G. Keefer, 4324 W. 11th Ave., Vancouver, B.C., Canada, V6R 2M1

[21] Appl. No.: 27,664

[22] Filed: Apr. 6, 1979

Related U.S. Application Data

[63] Continuation-in-part of Ser. No. 886,429, Mar. 14, 1978, Pat. No. 4,187,173, which is a continuation-in-part of Ser. No. 782,540, Mar. 28, 1977, abandoned.

[51] Int. Cl.³ .................... B01D 31/00; B01D 13/00
[52] U.S. Cl. ................................ 210/637; 210/652; 417/374; 417/541; 210/433.2; 210/416.1
[58] Field of Search ........................ 417/541, 374; 210/321 R, 433 M, 416 M, 136, 134, 137

[56] References Cited

U.S. PATENT DOCUMENTS

| | | | |
|---|---|---|---|
| 41,174 | 1/1864 | Bullinger | 417/541 |
| 1,388,254 | 8/1921 | Hansen | 210/416.1 X |
| 2,261,469 | 11/1941 | Harter | 210/416.1 X |
| 2,308,974 | 1/1943 | Harper | 210/416.1 X |
| 2,802,424 | 8/1957 | Lee | 210/416.1 X |
| 3,254,607 | 6/1966 | Norton | 210/416.1 X |
| 3,367,278 | 2/1968 | Kubourne | 210/416.1 X |
| 3,558,242 | 1/1971 | Thomas | 417/374 |
| 3,637,081 | 1/1972 | Bradley | 210/134 X |
| 3,749,524 | 7/1973 | Jordan | 417/323 |
| 3,807,909 | 4/1974 | St. Clair | 417/517 |
| 4,124,488 | 11/1978 | Wilson | 210/416 M |

FOREIGN PATENT DOCUMENTS

| | | | |
|---|---|---|---|
| 2442741 | 3/1976 | Fed. Rep. of Germany | 210/416.1 |
| 2444740 | 4/1976 | Fed. Rep. of Germany | 210/416.1 |
| 2717297 | 10/1978 | Fed. Rep. of Germany | 210/416.1 |
| 1355682 | 2/1963 | France | 210/416.1 |
| 1497712 | 10/1966 | France | 210/416.1 |

Primary Examiner—Frank A. Spear, Jr.

[57] ABSTRACT

Reverse osmosis, particularly for water desalination, uses semipermeable membranes which selectively permeate purified water from a feed solution pressurized by a reciprocating feed pump driven by rotating crankshaft. Pump action is assisted by depressurizing concentrate fluid within the pump cylinder, which has an internal displacer separating feed and concentrate fluids. Directional valves controlling concentrate fluid flow to and from pump cylinder are actuated mechanically by crankshaft. A dwell interval is provided in displacer motion to permit completion of directional valve actuation while displacer is stationary and displacer rod is providing compression or decompression action to approximately equalize pressure differences across valve ports prior to valve actuation. Detrimental concentration polarization is reduced by reducing pressure and flow fluctuations across membranes by using a differential surge absorber, a multi-feed cylinder pump in which the feed cylinders are phased apart, or a single feed cylinder pump with one or more recirculating cylinders phased equally from the feed cylinder to supply pulses of recycled concentrate fluid. In the multi-cylinder pumps, actuation of the piston rod of one cylinder can be used to actuate a directional valve of another cylinder, which can be a spool valve integral with displacer rod.

34 Claims, 11 Drawing Figures

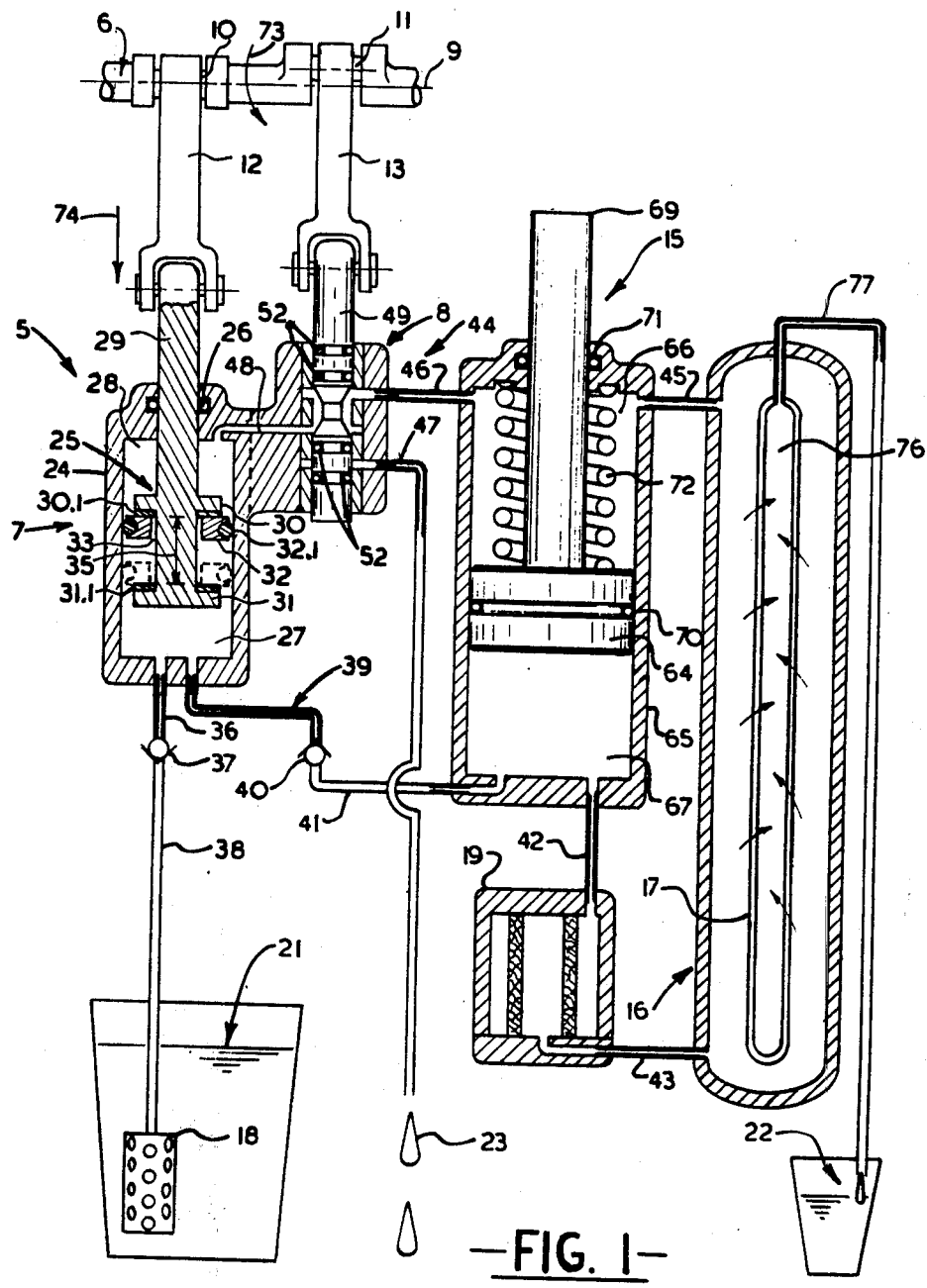
-FIG. 1-

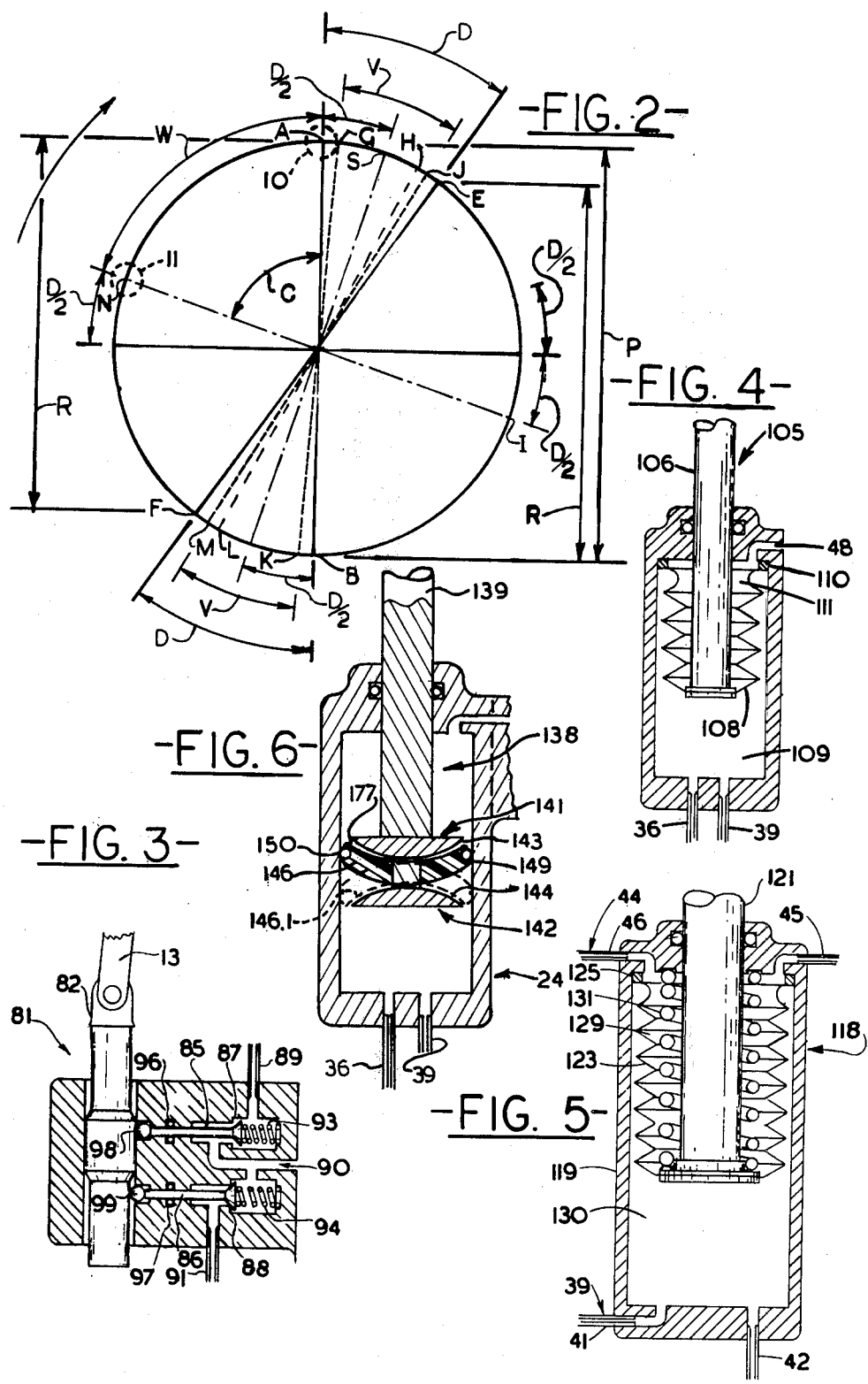

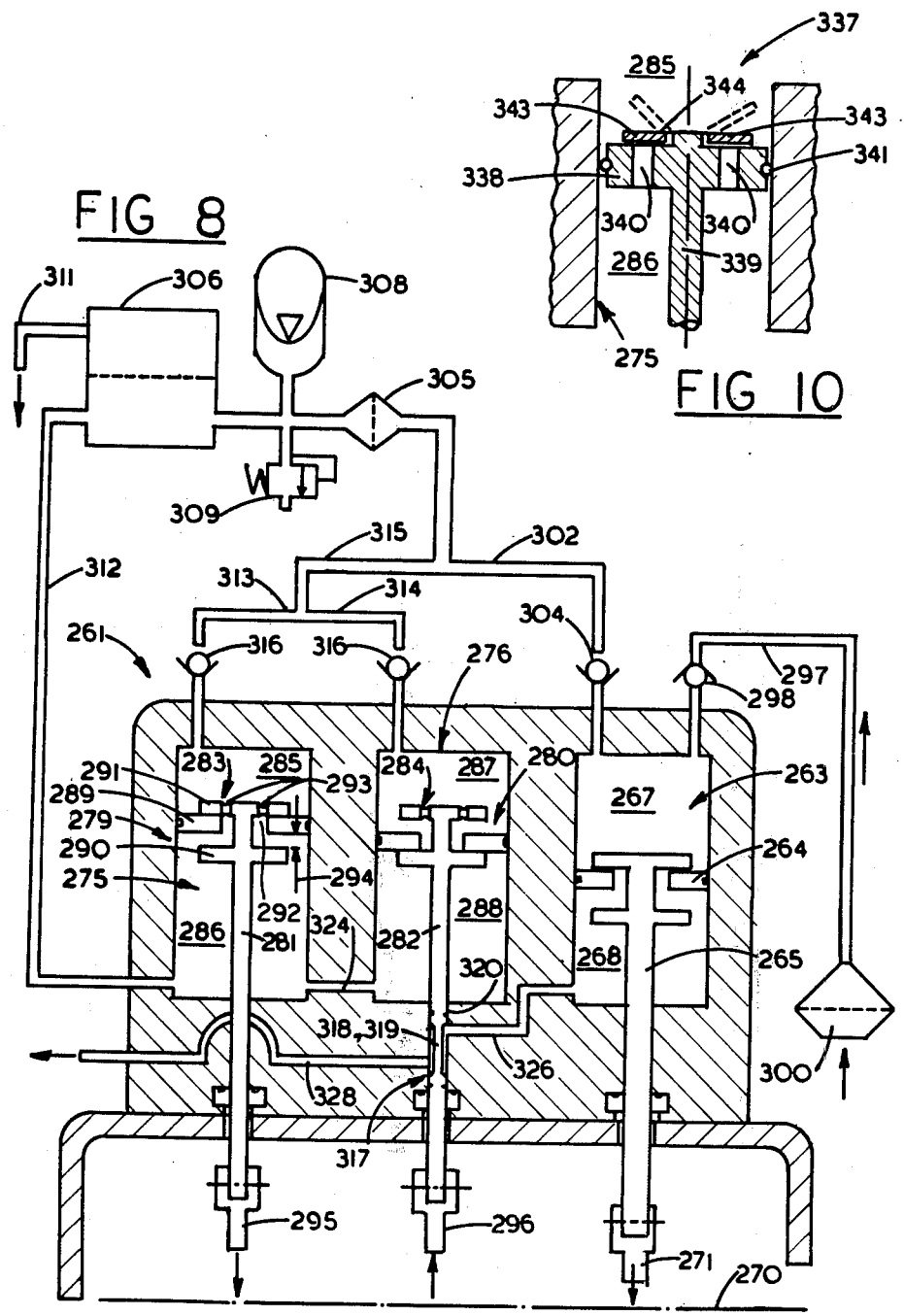

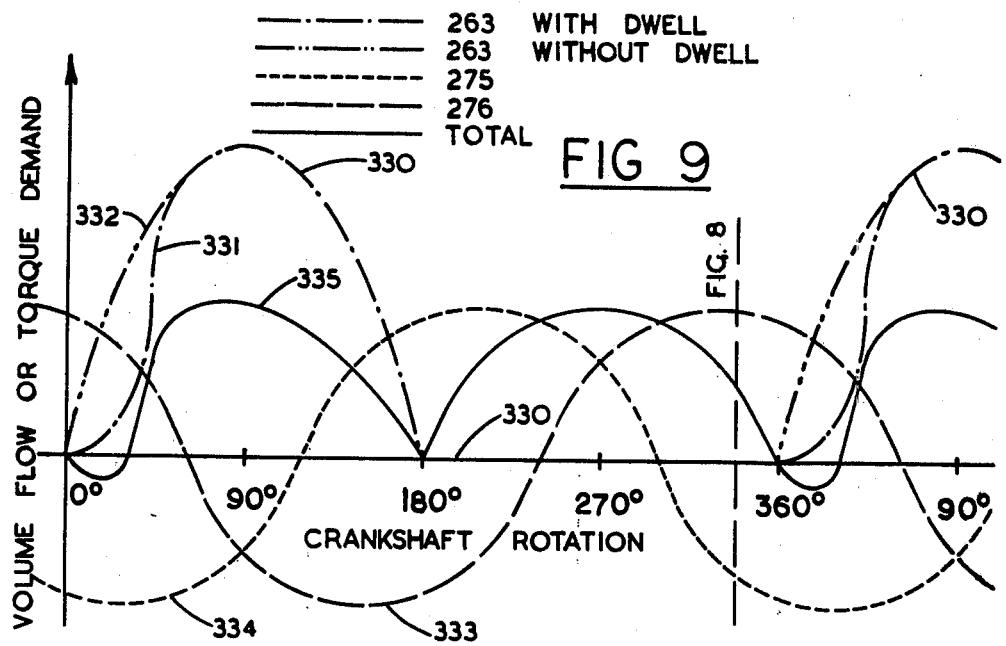
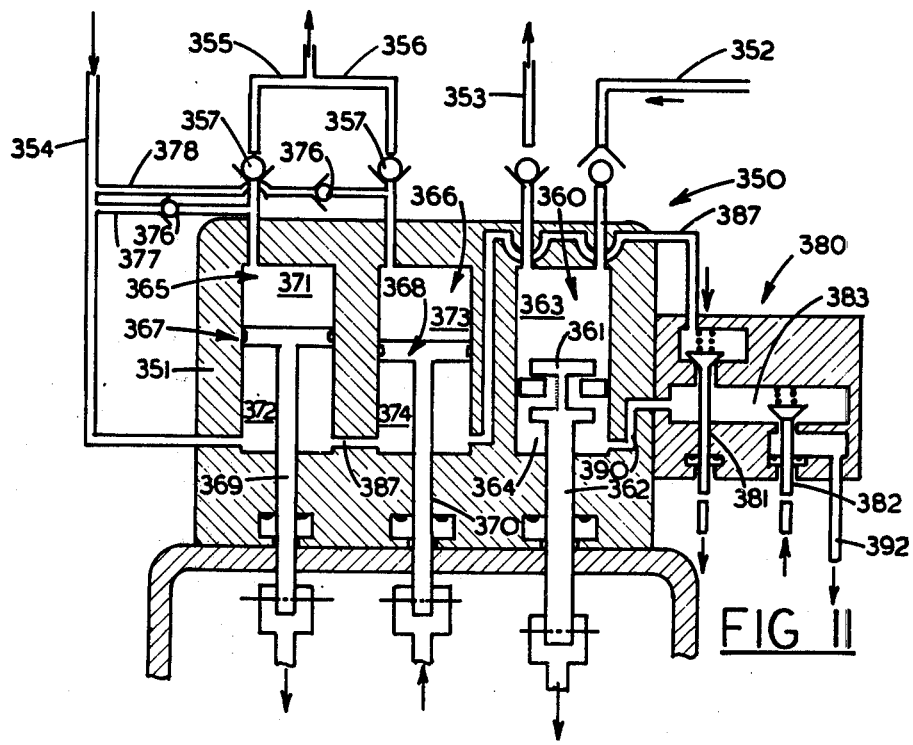

ROTARY SHAFT DRIVEN REVERSE OSMOSIS METHOD AND APPARATUS

CROSS REFERENCES TO OTHER APPLICATIONS

This is a continuation-in-part of my copending application Ser. No. 886,429 filed Mar. 14, 1978 entitled REVERSE OSMOSIS METHOD AND APPARATUS, now U.S. Pat. No. 4,187,173. This copending application was also a continuation-in-part of my application Ser. No. 782,540 filed Mar. 28, 1977 entitled REVERSE OSMOSIS APPARATUS AND METHOD WITH ENERGY RECOVERY RECIPROCATING PUMP, now abandoned.

BACKGROUND OF THE INVENTION

1. Field of the Invention

The invention relates generally to reverse osmosis and ultrafiltration fluid separation processes, and is applicable particularly to water desalination and purification by reverse osmosis.

2. Prior Art

In reverse osmosis a feed fluid, eg. saline water, is pumped at an elevated working pressure into a pressure vessel containing semipermeable membranes. Purified product water of greatly reduced salinity permeates across the membranes into a low pressure collector if the working pressure exceeds feed fluid osmotic pressure. Considerable excess working pressure above the feed fluid osmotic pressure is required to produce sufficient product water flux across membranes of reasonable surface area, and also to ensure sufficient dilution of the small but finite salt diffusion through the membrane which always exists when there is a concentration gradient across such membranes. For sea water whose osmotic pressure is about 25 Kg/sq. cm., typical working pressure for single stage reverse osmosis is of the order of 70 Kg/sq. cm.

While some of the feed fluid stream permeates through the membranes, the balance becomes increasingly concentrated with salt rejected by the membranes. In a continuous reverse osmosis process, a concentrate fluid stream must be exhausted from the vessel to prevent excessive salt accumulation. In sea water desalination, this concentrate fluid stream may be typically 70 per cent and sometimes as much as 90 per cent of the feed stream. The concentrate stream leaves the vessel at almost full working pressure, but before the concentrate stream is exhausted from the apparatus, it must be depressurized. The concentrate stream can be depressurized by throttling over a suitable back pressure valve to regulate the working pressure and dissipate all the pressure energy, but this energy dissipation reduces efficiency. It is known to recover some of the concentrate fluid pressure energy and two examples of energy recovery devices in reciprocating pumps are shown in U.S. Pat. No. 3,558,242, Inventor W.D. Jenkyn-Thomas, and 4,124,288, Inventor L. P. S. Wilson. In these patents, a sliding spool valve or rotary valve is used to control direction of concentrate fluid flow into and out from the expansion chamber of the feed pump, the valve being phased relative to the pump stroke to permit fluid entry and exit precisely at extreme limits of the piston stroke. This, of course, requires accurate valve timing and fast valve shift to reduce chances of hydraulic lock or system pressure loss, because movement of the valve means cannot occur while the piston means is moving. It follows that the valve timing mechanism requires close manufacturing tolerances, and thus excessive wear in the valve mechanism would likely produce severe problems.

As stated previously, the working pressure is commonly of the order of 70 Kg/sq. cm. and thus directional valve gear is subject to relatively high forces, particularly in view of the relatively poor lubricity of sea water. In the two references referred to above, directional valve shifting occurs across ports subjected to high pressure difference which subject the valves to severe erosion problems, and may impose high loading on the valve gear, tending to aggravate wear and compound the risk of pressure loss.

Furthermore, for high efficiency, concentration polarization must be controlled during reverse osmosis. Concentration polarization is the tendency for a concentration gradient to develop in the feed fluid stream with high salt concentration adjacent the membrane face. This tendency results from the bulk transport of saline feed water toward the membrane face and the accumulation of salt in the boundary layer adjacent the membrane face as less saline water permeates through the membrane, balanced by diffusion of salt back out of the boundary layer. Concentration polarization is detrimental especially with feed fluid solutions of high osmotic pressure such as sea water, because the membrane sees a higher concentration which raises the effective osmotic pressure. When concentration polarization occurs, working pressure for given product flux must be increased, product salinity will be increased, and membrane life may be impaired.

Reverse osmosis systems are typically designed to reduce concentration polarization effects by forced convection through the membrane array. It is essential that continuous feed circulation be maintained past the membranes, because even momentary stagnation of flow may cause severe concentration polarization. Whilst hydraulic accumulator devices are satisfactory in some applications to reduce pressure and flow fluctuations across the membranes during return strokes of the pump, in other applications improved forced convection can be attained by circulating a low ratio of product flow to concentrate flow across the membrane faces, or by auxiliary recirculation, or by mechanical stirring devices. However, recirculating flows past the membranes, stirring devices, etc. commonly increase considerably the complexity of the apparatus.

SUMMARY OF THE INVENTION

The invention reduces difficulties and disadvantages of the prior art by providing a rotary driven feed pump apparatus having a yieldable piston means adapted for axial movement relative to the piston rod means. This relative movement provides two major advantages as follows. It provides an adequate period of time, termed "dwell" interval, when the piston means is stationary so that the actuation of a directional valve means controlling fluid flow to the feed pump occurs during a period of zero fluid transfer from the pump. The yieldable piston means permits sufficient piston rod movement without piston means movement to essentially equalize pressure differences across the ports of the directional valve. Thus the piston means acts as a displacer mainly to displace fluid, whilst the relative movement of the piston rod acts to pressurize fluid. Thus the valve can be actuated at an appropriate time while pressure differences across the ports thereof are essentially equal, thus reducing wear of valve components. Furthermore, in some embodiments of the pump, limited intermixing of fluids across the displacer is permitted to assist in equalization of fluid pressure differences across the valve ports prior to valve actuation. In a multi-cylinder embodiment, mechanical simplicity is attained by providing integral with the piston rod of each cylinder a valve controlling fluid flow to another cylinder. Also, in a further embodiment, concentration polarization effects are reduced by using one or more recirculating pumps to provide pulses of concentrate fluid flow phased apart from pulses of the main feed fluid flow.

Membrane separation apparatus according to the invention separates the feed fluid into a permeate fluid fraction and a concentrate fluid fraction which respectively are permeated and rejected by semipermeable membrane means. The apparatus is characterized by a reciprocating feed pump means, inlet, outfeed and return conduit means, means communicating with the membrane means to reduce fluctuations in pressure and fluid flow across the membranes, first and second valve means for directing fluid to and from the membranes, rotatable drive means and a dwell means to ensure timely valve actuation. The reciprocating pump means has a feed cylinder, a movable feed displacer and a feed displacer, rod, the displacer dividing the cylinder into a pumping chamber in which the feed fluid is pressurized and an expansion chamber in which the concentrate fluid fraction is depresssurized. The displacer cooperates with the displacer rod which extends through the expansion chamber and has sealing means to prevent leakage of fluid from the cylinder. The cylinder and feed displacer rod have relative diameters which define cylinder/displacer rod proportions such that ratio of swept volume of displacer rod to swept volume of the displacer determines, in part, recovery ratio of premeate fluid fraction to total feed fluid flow. The inlet conduit means communicates with the pumping chamber to admit feed fluid into the pumping chamber, and the outfeed conduit means is adapted to communicate the pumping chamber with the membranes so as to conduct pressurized feed fluid from the pumping chamber to the membranes. The return conduit means is adapted to communicate the membranes with the expansion chamber so as to conduct the concentrate fluid fraction from the membranes to the expansion chamber. The first valve means communicates with the expansion chamber and has a closed intermediate position between first and second positions. The second valve means are non-return valve means communicating with the pumping chamber. The first and second valve means cooperate with the conduit means so as to direct fluid flow from a feed fluid source, and to and from the membrane means, and to exhaust depressurized concentrate fluid fraction from the expansion chamber. The rotatable drive means actuates the feed displacer rod and the first valve means whilst maintaining a phase angle difference between the displacer stroke and the first valve means actuation. The dwell means is associated with the pump means and drive means to ensure that the first valve means is shifted across the closed intermediate position thereof during an interval of essentially zero fluid transfer from the cylinder after the beginning of each stroke of the displacer rod. The dwell means is characterized by a yieldable means associated with the displacer and the displacer rod to permit relative axial movement between a portion of the displacer and the displacer rod in response to reversal of pump action. The dwell means is also characterized by cooperation between the displacer and the drive means such that there is a dwell interval between the valve actuation and the displacer movement sufficient to approximately equalize pressure differences across ports of the first valve means that are about to be opened or closed prior to opening or closing of said ports. Thus, in a first position of the first valve means, pressurized feed fluid from the pumping chamber is fed to the membranes through the second valve means while pressurized concentrate fluid is discharged into the expansion chamber through the first valve means, so that depressurization of the concentrate fluid returning from the membrane means assists in pressurizing of the feed fluid. In a second position of the first valve means, depressurized concentrate fluid is exhausted from the expansion chamber through the first valve means while feed fluid is inducted into the pumping chamber through the second valve means.

A method of membrane separation according to the invention can be practiced in apparatus as above specified and is characterized by the following steps. As the displacer rod initiates an induction stroke, yield is permitted between portions of the displacer and the displacer rod so that there is relative movement therebetween. While feed fluid is being inducted into the pumping chamber, simultaneously depressurized concentrate fluid is being exhausted from the expansion chamber. After the end of the induction stroke of the displacer, the valve means is shifted across the closed intermediate position thereof during an interval of zero fluid transfer in the cylinder and when pressure differenece across the first valve means is relatively low. As the displacer rod initiates a pumping stroke, yielding is permitted between portions of the displacer and the displacer rod so that there is relative movement therebetween. While pressurizing feed fluid in the pumping chamber to force the pressurized feed fluid to the membrane means, simultaneously the pressurized concentrate fluid fraction is admitted into the expansion chamber from the membrane means. The concentrate fluid fraction is depressurized in the expansion chamber to supplement energy supplied to the displacer in the pumping stroke so that pressure differences across the displacer are relatively low. After the end of the pumping stroke of the displacer, the valve means is shifted during an interval of zero fluid transfer in the expansion chamber when pressure difference across the valve means is relatively low.

The following detailed description following, related to the drawings, describes preferred apparatus and method according to the invention which, however, are capable of expression in structure and method other than those particularly described and illustrated.

DESCRIPTION OF THE DRAWINGS

FIG. 1 is a simplified, fragmented diagram showing a crank-driven, single feed cylinder pump according to the invention, the pump having a first embodiment of a displacer or piston means, FIG. 2 is a diagram showing the valve timing and operation of the displacer and displacer rod, FIG. 3 is an alternative directional valve means used in the invention, FIG. 4 is a second embodiment of a feed cylinder, FIG. 5 is an alternative differential surge absorber, FIG. 6 is a third embodiment of a feed cylinder, FIG. 8 is an alternative three-cylinder, crak-driven pump in which one cylinder is a feed cylinder and two cylinders are recirculating cylinders, the pumps using an integral directional spool valve and internal fluid transfer means, FIG. 9 is a graphical representation of idealized flow or crankshaft torque demand of the FIG. 8 embodiment, FIG. 10 is a fragmented diagrammatic section through an alternative internal fluid transfer means in a piston means of a recirculating cylinder, and FIG. 11 is an alternative three-cylinder pump in which one cylinder is a feed cylinder and two cylinders are recirculating cylinders, the pump using an external poppet valve directional valve means, and external fluid transfer means.

DETAILED DISCLOSURE

FIG. 1

Figure 7:
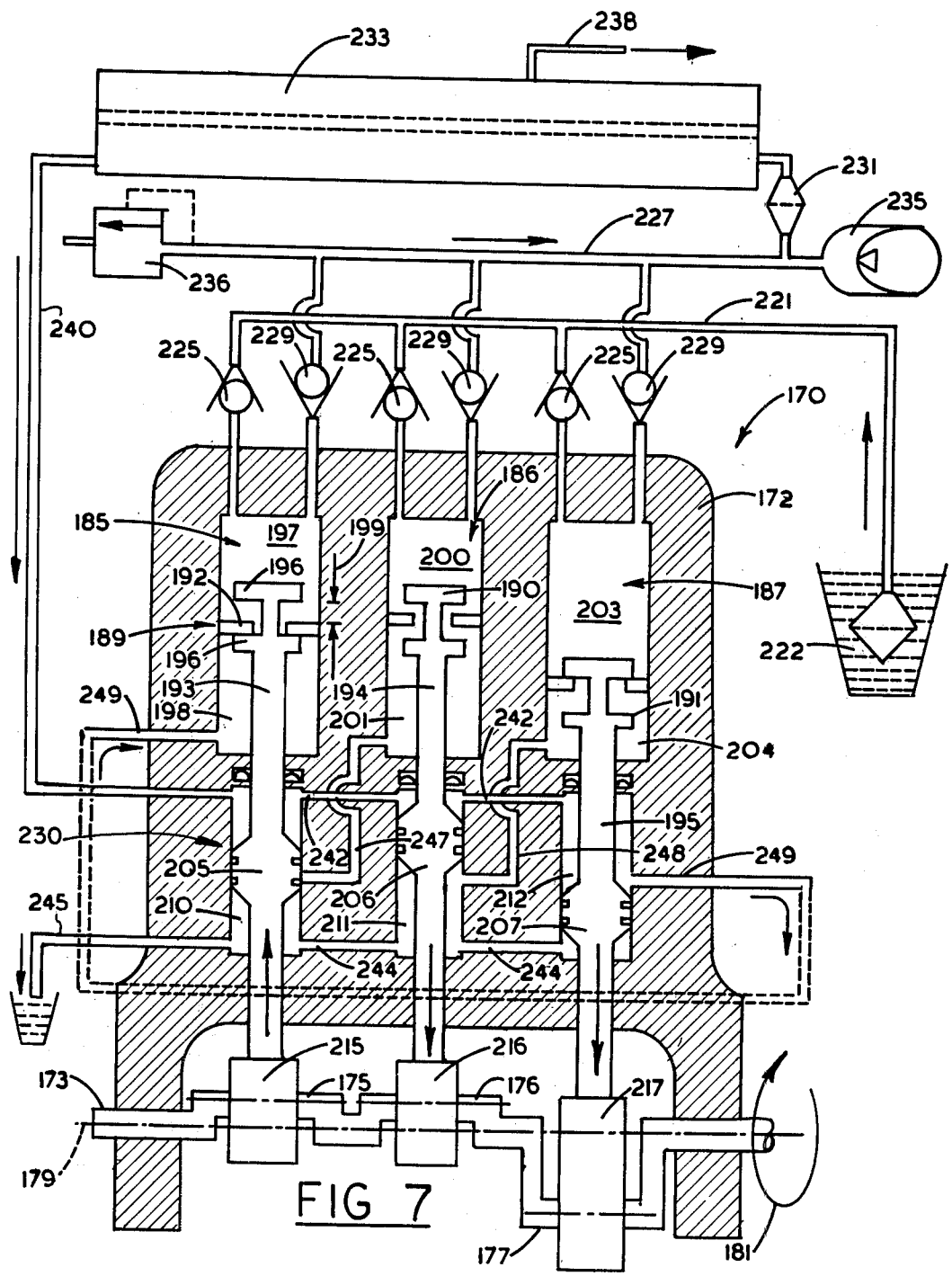
FIG. 7 is an alternative three-cylinder, crank-driven feed pump according to the invention, utilizing three feed cylinders.

A first embodiment 5 of a membrane separation apparatus according to the invention includes a crankshaft 6, a reciprocating feed pump means 7 and a directional three-way valve assembly 8. The crankshaft 6 is mounted in journals, not shown, for rotation about an axis 9 and has a pair of crank pins or throws 10 and 11 spaced at a suitable phase angle, as will be described, the throw 10 being shown at approximately mid-stroke and the throw 11 being shown at top dead center. Connecting rods 12 and 13 connect the throws 10 and 11 to the pump means 7 and valve means 8. The apparatus further includes a differential surge absorber 15, a membrane vessel 16 containing semipermeable membrane means 17, and optional low and high pressure filters 18 and 19. Feed fluid 21 is separated into a permeate fluid fraction 22 and a concentrate fluid fraction 23 which are respectively permeated and rejected by the membrane means.

The pump means 7 has a feed cylinder 24 and a movable feed piston means or feed displacer 25, the piston means dividing the cylinder into a pumping chamber 27 in which the feed fluid is pressurized, and an expansion chamber 28 in which the concentrate fluid is depressurized. Several equivalent piston means are envisaged, all of which function more as a fluid displacer than as a fluid pressurizer and differ from conventional rigid pistons as will be described. Whilst the terms "piston means", "displacer", etc. are used in the disclosure, the term "displacer" is used in the broad claims includes all such embodiments. The piston means cooperates with a piston rod means or feed displacer rod 29 extending through the expansion chamber and is hinged to the connecting rod 12 so that rotation of the crankshaft reciprocates the piston rod means. The piston rod means 29 has a pair of spaced stops 30 and 31 fitted with oppositely facing resilient pads 30.1 and 31.1. The piston means 25 includes a piston disc 32 with a bore 33 accepted in a sliding fit on the piston rod means, the disc being interposed between the pads of the spaced stops and being free to slide between the stops, the pads reducing shock loads when the disc 32 contacts the stops. Alternatively, the piston disc itself, or the stops may be resilient to reduce shock loads. Clearance between the bore 33 and piston rod means 29 is sufficient to permit a limited flow of fluid therethrough when the disc 32 is clear of the stops. A dynamic seal 32.1 surrounds an outer periphery of the piston disc 32 to prevent excessive leakage of fluid past the outer periphery and the cylinder wall. Spacing 35 between the pads of the stops and thickness of the disc are such that the piston rod means 29 can move axially through the disc 32 with negligible movement of the disc between approximately 10 and 30 per cent of total piston stroke. Hence the piston disc 32 floats on the piston rod means, and the reciprocating stroke of the piston disc 32 will be less than that of the piston rod means 29, and is a feature of importance to the invention as will be described. Sealing means 26 around the rod means prevents leakage of fluid from the cylinder. The cylinder 24 and thus the piston means 25 or disc 32, and the piston rod means 29 have relative diameters which define piston rod or displacer rod/cylinder proportions which, as will be described, determine in part recovery ratio of permeate fluid fraction to total fluid flow.

Inlet conduit means 36 communicate with the pumping chamber 27 to admit feed fluid 21 from a feed conduit portion 38 immersed in feed fluid, a non-return check valve 37 admitting the feed fluid through the filter 18 and conduit portion 38 whilst preventing return flow from the the chamber into the conduit means 36. Outfeed conduit means 39 communicate the pumping chamber with the membrane means 17 via the differential surge absorber 15 and filter 19 to conduct pressurized feed fluid from the pumping chamber to the membrane means. A non-return check valve 40 in the conduit 39 prevents return flow of fluid into the pumping chamber.

The outfeed conduit 39 consists of a conduit portion 41 extending between the differential surge absorber 15 and the pumping chamber, a conduit portion 42 extending between the differential surge absorber and the filter 19, and a conduit portion 43 extending from the filter 19 to the membrane vessel 16. A return conduit means 44 communicates the membrane means with the expansion chamber 28 to conduct the concentrate fluid fraction from the membrane means to the expansion chamber 28. The means 44 has a conduit portion 45 extending between the differential surge absorber 15 and the membrane vessel 16, and a conduit portion 46 extending between the directional valve assembly 8 and the differential surge absorber 15. The valve assembly 8 has a vent or exhaust conduit 47 to conduct the concentrate fluid fraction 23, usually to waste, and a connecting conduit 48 communicating with the expansion chamber 28.

The valve assembly 8 is a three-way directional control valve and has a sliding valve spool 49 having an upper end hinged to the rod 13 to impart reciprocating linear travel to the spool. The spool is shown at an upper limit of travel in which the conduit portion 46 is connected with the connecting conduit 48 to conduct the concentrate fluid fraction from the membranes to the expansion chamber. At a lower limit of travel, not shown, the connecting conduit 48 is connected to the exhaust conduit 47 as will be described. Because water has low viscosity and lubricity, the spool 49 is fitted with dynamic sealing rings 52 of suitable composition, for example glass-filled fluorocarbon polymeric compounds to minimize leakage and prevent spool seizure. Thus, the valve assembly 8 is a two-position, center-closed, three-way valve having a movable spool, the spool having travel between two positions through a closed intermediate position to interchange conduit connections, the travel being determined by throw of the crank pin 11. The valve assembly 8 directs fluid to or from particular conduits communicating with the expansion chamber 28, and is termed a first valve means. The non-return valves 37 and 40 control flow in conduits communicating with the pumping chamber 27 and are termed second valve means. As will be described, the first and second valve means cooperate with the conduit means so as to direct fluid flow from the fluid source and to and from the membrane means and clearly alternative first and second valve means can be substituted.

The differential surge absorber 15 has a cylinder 65 and a piston means 64, the piston means dividing the cylinder 65 into a concentrate surge absorber chamber 66 and a feed surge absorber chamber 67. The piston means cooperates with a piston rod means 69 extending through the concentrate surge absorber chamber 66 and has sealing means 70 and 71 to prevent mixing and leakage of fluid. For smooth operation of the surge absorber the seals are selected for low friction characteristics. A compression spring 72 encloses the piston rod means and extends between the piston means 64 and the chamber so that the piston means is effectively spring-loaded and double-acting and reciprocable within the cylinder. Thus, the spring means cooperates with the piston means to force the piston means in a direction to exhaust the feed surge absorber chamber. The feed surge absorber chamber 67 is exposed to pressurized feed fluid in the portion 41 of the outfeed conduit 39 and also communicates with the membrane vessel 16 through the conduit portions 42 and 43. The concentrate surge absorber chamber 66 is exposed to the concentrate fluid fraction in the conduit portion 45 of the return conduit means 44 and also communicates with the valve assembly 13 through the portion 46.

The piston means 64 and piston rod means 69 function similarly to the feed displacer 25 and feed displacer rod 29, and thus can be also considered as an absorber displacer and absorber displacer rod. The piston rod means 69 and the cylinder 65 of the surge absorber chamber 67 have relative diameters generally similar to the piston rod/cylinder proportions of the feed pump 7, but have a displacement several times greater and thus can accommodate the recovery ratio of the permeate fluid fraction to the total fluid fraction. One feature of the differential surge absorber is approximate coupling of the concentrate and feed surge absorber chambers 66 and 67 with a ratio similar to that of the pump means 7, ie. a similar displacement ratio, so as to serve as a load leveller for the pump means. The spring 72 is relatively small and the piston rod means 69 is of relatively small area when compared with the piston means 64, and the differential surge absorber is charged to full effectiveness within a few crankshaft revolutions when starting up as will be described. It should be noted that extension of the piston rod means 69 from the surge absorber provides a visual indication of hydrostatic pressure of the system by its position at any instant. Piston rod/cylinder area proportions of displacement volumes can be within the range of 1:10 and 1:2 for practical recovery ratio.

The membrane means 17 are housed in the membrane vessel 16 in suitable arrays known in the art and a low pressure product channel 76 receives product water from the membranes which is discharged through product conduit 77. The geometry of the membrane arrays in the membrane container vessel is designed to ensure sufficient forced convection of the feed fluid to prevent excessive concentration polarization effects. If the feed fluid flow velocity is dropped too low, concentration polarization effects can become severe.

OPERATION

Referring to FIG. 1, initially complete movements of the piston means and valves are not described in detail but are simplified to provide a broad understanding of the operation of the invention, which is then described in detail with reference to FIG. 2. As the crankshaft 6 is rotating in direction of an arrow 73, the feed piston means 25 is moving downwards in direction of an arrow 74 to execute a pumping stroke. The piston disc is forced against the stop 30 to prevent leakage through the bore 33 of the disc. The valve spool 49 is momentarily in its uppermost position in which the vent conduit 47 is closed, and the conduit portion 46 communicates with the connecting conduit 48 to pass the pressurized concentrate fluid fraction from the membrane vessel 16, through the chamber 66 of the differential surge absorber, through the valve assembly 8 into the expansion chamber 28 to act on a rear face of the piston means 25. The concentrate fluid is depressurized in the chamber 28 and generates a force on the piston means which augments force from the connecting rod 12 as the piston means travels downwards in the pump cylinder 24 in direction of the arrow 74, simultaneously pressurizing feed fluid in the pumping chamber 27. The check valve 37 is held closed by the feed fluid pressure and the check valve 40 is open to transmit pressurized feed fluid from the pumping chamber 27 through the conduit portion 41 into the feed surge absorber chamber 67 of the differential surge absorber 15. Pressurized feed fluid from the chamber 67 passes through the conduit portion 42, through the high pressure filter 19 and the conduit portion 43 into the membrane vessel 16.

The permeate fluid fraction is permeated by the membrane means and passes into the low pressure product channels 76 to be collected from the product conduit 77. The concentrate fluid fraction is rejected by the membrane means and passes through the conduit portion 45 into the concentrate surge absorber chamber 66, through the conduit portion 46 and the valve assembly 8 into the expansion chamber 28. The concentrate fluid pressure acts on the rear face of the piston means 25 and hydrostatic pressure energy of the concentrate fluid can be utilized, permitting recovery of a substantial portion of the energy supplied to the feed fluid. Pressure of the concentrate fluid in the expansion chamber 28 is only slightly less than pressure of feed fluid in the pumping chamber 27 and thus, taking into consideration the reduced area of the rear face of the piston upon which pressure of the concentrate fluid acts, the crankshaft has to supply only a fraction of the power that would have been required without energy recovery.

As will be described in greater detail with reference to FIG. 2, when the crank pin 10 is diametrically opposite to the position shown in FIG. 1, the piston disc is moving upwards executing a return or induction stroke and is against the stop 31, as shown in broken outline, again preventing leakage through the bore 33. The valve spool 49 is in an opposite position, not shown, in which the conduit portion 46 is closed, thus isolating the valve assembly 8 from the surge absorber 15, and the vent conduit 47 is open and communicates with the connecting conduit 48 and is thus exposed to fluid in the expansion chamber 28. The check valve 37 is open to induct feed fluid into the pumping chamber 27, and the check valve 40 is closed preventing return flow of fluid from the differential surge absorber. Upwards movement of the piston means on the return stroke exhausts depressurized concentrate fluid from the expansion chamber 28 through the valve assembly and the vent conduit 47, usually to waste.

As pressure in the feed surge absorber chamber 67 drops slightly as a result of continuing permeation of product water through the membrane means 17, the spring 72 forces the differential surge absorber piston means 64 downwards towards the conduit portions 41 and 42. Force from the spring 72 is augmented by pressure of concentrate fluid from the membrane means flowing into the concentrate surge absorber chamber 66 and acting on the rear face of the piston means 64. Downward movement of the piston means 64 of the differential surge absorber maintains a flow of feed fluid into the membrane vessel and across the membrane means, thus tending to reduce concentration polarization effects that would otherwise occur. Thus, stagnant flow conditions on the concentrate fluid side of the membrane means during the return stroke of the feed pump are reduced and there is sufficient displacement of the piston means 64 to maintain adequate flow through the membrane vessel throughout the return stroke. It can be seen that the differential surge absorber 15 serves as a means communicating with the membrane means to provide essentially uniform pressure and feed fluid flow across the membranes during operation of the apparatus. The differential surge absorber communicates with the outfeed and return conduit means and is interposed between the membrane means and the first and second valve means to absorb pressure fluctuations while providing essentially uniform fluid flow across the membranes.

It is noted that upon reversal of piston rod movement there is relative movement, ie. axial sliding, between the piston disc 32 and the piston rod means 29. This results in lost motion or dwell of the piston disc 32 following piston rod reversal and is essential to operation of the invention, although the dwell can be attained with different structures. In the description following, the dwell is described in detail and this effect permits shifting of the valve means 8 during an interval of zero fluid transfer in the cylinder with negligible pressure loss and with reduced valve wear, as will be described. The piston disc is described as reciprocating between stops 30 and 31 on the piston rod means, whereas in fact it reciprocates between the pads 30.1 and 31.1 on the stops.

FIG. 2, With Some Reference to FIG. 1

FIG. 2 shows piston and valve relative positions and sequences for a complete clockwise revolution of the crankshaft 6, angular spacing not being to scale for clarity. Top dead center of the throw 10 of the piston rod means is taken as crankshaft datum and is designated A which is immediately prior to a piston pumping stroke, and corresponding bottom dead center, which is immediately prior to a piston induction stroke, is designated B. Dwell D is the interval of zero fluid transfer in the feed cylinder following reversal of reciprocating action applied to the piston rod means and, in this embodiment dwell can be defined as the interval, expressed as angular spacing or dwell angle D, between commencement of piston rod pumping stroke at A and commencement of piston means pumping stroke designated E. The same definition applies for a piston rod induction stroke and its angular spacing between B and F. The sequence of operation is as follows. The throws 10 and 11 are indicated in broken outline on the diagram spaced at a phase angle C which is somewhat less than 90 degrees and thus is compatible with FIG. 1. Note that the throw 10 is shown at top dead center and is thus in a position which is shifted about 90 degrees relative to the crankshaft datum when compared with the position shown in FIG. 1.

During an induction stroke, the piston means approaches A and the valve means 8 is connecting conduits 48 and 47 to vent concentrate fluid from the expansion chamber, while conduit 46 is closed. Fluid pressure in chambers 27 and 28 is low and shortly after A, at G, the conduits 48 and 45 are disconnected or closed with the conduit 46 remaining closed. Thus all conduits are closed in the closed center position of the valve and there can be no fluid transfer from the cylinder. Piston rod means 29 starts moving downwards into the chamber 27, whilst the piston disc 32 remains stationary, the rod means acting as a pump plunger pressurizing feed fluid in the chamber 27 which is a closed chamber. As pressure in the chamber 27 increases, slightly before E at H the check valve 40 (see FIG. 1) begins to open to deliver feed fluid into the differential surge absorber 15 through the conduit portion 41. Between H and E, at J the first valve means re-opens to connect the conduit portions 48 and 46 at which time pressure in these two conduit portions has already been approximately equalized by the pump plunger action of the piston rod means, and shortly thereafter at E the stop contacts the piston disc 32 so that the piston disc now moves with the piston rod means, thus terminating the dwell interval D and commencing the piston means pumping stroke proper.

Further rotation of the crankshaft 6 completes the piston rod pumping stroke, whilst the valve spool 49 reaches top dead center position of its stroke at I and then starts to descend. At bottom dead center B the piston disc reaches its lower limit in the cylinder, commencing the dwell interval and the check valve 40 closes. Shortly thereafter at K the valve 8 closes the conduits 48 and 46, with the conduit 45 remaining closed, once again at the closed center position. The piston rod means again passes through the stationary piston disc 32 and acts as a pump plunger to withdraw from the chamber 27 which is closed and thus pressure therein is reduced. When the pressure is further reduced shortly before F, the check valve 37 opens at L and feed fluid begins to enter the pumping chamber 27 through the conduit 36. Shortly afterwards, at M, the valve 8 connects the conduits 48 and 45 at which stage the pressure in the conduits 48 and 45 has been approximately equalized. Shortly thereafter at F, the stop 31 contacts the piston disc 32 terminating the piston dwell period and the piston disc now commences an induction stroke. The piston disc completes the induction stroke while the valve passes its bottom dead center position at N and then reverses. The piston rod means 29 returns to the top dead center position A, completing the cycle which is then repeated. Angular separation between points A and G, H and J, J and E and corresponding positions on the diametrically opposite side are shown exaggerated and typically might be between 2 and 5 degrees depending on size of fluid ports, and valve spool geometry, manufacturing tolerances and volume changes of the cylinder, etc. due to pressure variations. Dwell D might be between 20 degrees and 60 degrees for the single cylinder embodiment shown. Projections P and R from the diagram represent piston rod stroke and piston disc stroke respectively for both induction and pumping strokes.

To retain the above sequence of valve actuation relative to piston means position, the throw 11 of the valve means must be spaced 90 degrees from a mid-point S of the dwell interval D. Thus, as drawn, the throw 11 for the valve spool is spaced at a phase shift of $(90-(D/2))$ degrees lagging the throw 10 for the piston means and thus, valve top center I follows piston top dead center A by a phase shift angle of $(90-(D/2))$. Similarly, N precedes A by a phase shift angle of $(90-(D/2))$ degrees. Alternatively the throw 11 can be phased $(90+(D/2))$ degrees leading the the throw 10. Thus the displacer rod and first valve means are separated by a phase angle which differs from 90 degrees by half of the dwell angle.

Thus the provision of dwell using a floating piston requires a crankshaft having throws for actuation of the piston and respective valve means to be spaced apart or phased apart at angle other than 90 degrees to accommodate this dwell, at a phase angle of $(90\pm(D/2))$ degrees. This enables the first valve means to be fully closed during the dwell period, that is the valve is in its center closed position and the valve closure angle V of the first valve means is overlapped at both ends by portions of the dwell angle D. The center closed position of the valve prevents fluid leaving the cylinder and thus permits approximate equalization of pressures across ports of the first valve means about to be opened or closed. Approximate pressure equalization across related conduits increases life of critical valve seals and seats without severe erosion and wear usually experienced with high pressure fluids of low viscosity, low compressibility and low lubricity. Approximate equalization of pressure differences across the ports about to be opened also reduces the forces that must be applied to actuate the valve means, thus extending life and reliability of valve actuation mechanism. The embodiment 5 of FIG. 1 relies essentially on the position of the piston means as determined by the linkage to interchange smoothly the three-way valve assembly 8 as the piston means reaches its dead center positions at ends of piston stroke in the feed cylinder. It can be seen that both the piston rod means 29 and the valve spool 49 of FIG. 1 have smooth quasi-harmonic reciprocating motion which is appropriate for relatively large units where flow momentum effects are material. Dwell can be increased above the minimum required for valve sequencing to further reduce hydraulic shock which might otherwise occur. Clearly, in view of the incompressible character of sea water, the crankshaft actuated apparatus could not function without positive dwell provided by the floating piston means or equivalents. Relatively slow actuation of directional valves conveying a harsh liquid is desirable and this is attained by the quasi-harmonic valve actuation and dwell means. Valve closure angle V can be increased by slowing valve speed or extending closed center portion of the valve spool, but dwell D must overlap V at both ends. A suitable range of angles of dwell D would be about 20 degrees to 60 degrees, the greater dwell angles being more appropriate for higher operating pressures and/or speeds.

The dwell interval should be sufficiently long to enable valve actuation at acceptable speeds and also to enable approximate pressure equalization across the first valve. With relatively long dwell periods, the piston rod acquires considerable velocity at the end of the dwell interval, and relatively low crankshaft speeds are preferred to reduce contact shocks between the piston disc and stops.

ALTERNATIVES AND EQUIVALENTS

Alternative crank mechanisms equivalent to the simple two throw crankshaft can be substituted to provide separate quasi-harmonic motion of the piston rod means, a piston dwell interval after each reversal of the piston rod means, and a 90 degree phase difference from the midpoint of the dwell interval for actuation of the three-way valve. Alternatively mechanisms include, for example, swash plate drives, scotch yoke drives, axial and radial roller cam drives and others. Clearly, particularly with cam drives, a wide range of piston rod and valve spool accelerations and velocities are possible, and a wide range of dwell separations and periods can be attained.

FIG. 3

An alternative first valve means 81 is for use with the embodiment 5 of FIG. 1 and equivalents, and is a three-way valve having a spool which is effectively a sliding cam 82. The cam 82 actuates two two-way poppet valves 85 and 86 having complementary seats 87 and 88 communicating with conduits as follows. A return conduit portion 89 communicates with the diffential surge absorber, not shown, a connecting conduit 90 communicates with the expansion chamber of the pump means, not shown, and a vent or exhaust conduit 91 communicates with a concentrate fluid outlet, not shown. The valves 85 and 86 have respective springs 93 and 94 which initiate closure of the valve with fluid pressure differences augmenting sealing of the valve. Seals 96 and 97 mounted in stem guides prevents fluid leakage past the stems of the poppet valves, and hardened steel balls 98 and 99 protect the stems against lateral forces. It is mandatory that profile of sliding cam 82 be such that at least one of the poppet valves will remain seated at all times. If both poppet valves were lifted at once, even momentarily, the conduits 89 and 90 would be connected to vent pressure and the apparatus would be inoperative. The spool 82 is connected to the rod 13 of FIG. 1, and the means 81 can be directly substituted for the valve assembly 8 and functions similarly.

In operation, the valve is shown in a fully raised position which occurs on the pumping stroke and the cam 82 lifts the valve 85 off the seat 87 so that conduits 89 and 90 are connected to admit pressurized concentrate fluid from the membrane means into the expansion chamber. The valve 86 is seated by the spring 94 and unbalanced hydrostatic pressure. On the pump return stroke, not shown, the valve 86 is lifted off the seat 88 so as to vent the expansion chamber into the vent conduit 91, and the valve 85 is closed by the spring 93 and hydrostatic pressure, thus preventing concentrate fluid flow from the membrane means.

FIG. 4

An alternative pump cylinder 105 communicates with the inlet conduit 36, the outfeed conduit 39 and the connecting conduit 48, as previously described with reference to FIG. 1. The pump cylinder 105 has an alternative piston rod means 106 which cooperates with a flexible diaphragm or bellows 108 which is secured to the pump cylinder 105 by a static seal 110 at one end thereof and at an opposite end thereof to the piston rod means. The diaphragm thus divides the pumping cylinder into a pumping chamber 109 on one side of the diaphragm and an expansion chamber 111 on an opposite side of the diaphragm and thus separates feed and concentrate fluid fractions and serves as substitution for the piston means of the FIG. 1 embodiment. The flexible diaphragm is feasible because only small differences in hydrostatic pressure normally exist between the pump chamber 109 and the expansion chamber 111. The flexible diaphragm or bellows eliminates the friction losses of the seals 32.1 of the piston means 25 of FIG. 1 and also may simplify manufacturing since tolerances may be less critical. Preferably the diaphragm 108 should be elastically relatively stiff to prevent collapse under pressure differences, because if collapse occurs, its displacement will be reduced and it will not function satisfactorily. Alternatively, the feed fluid can be supplied to the inlet conduit 36 at a boost pressure exceeding exhaust pressure in connecting conduit 48. The diaphragm does not provide rigid boundaries between the feed and concentrate fluids and it can be seen that motion of the piston rod means 106 can cause fluid displacement in the pumping chamber 109 with zero fluid displacement in the expansion chamber 111. Thus the diaphragm is yieldable to fluid pressure as a result of piston rod motion and thus is compliant upon reversal of reciprocation action. Thus, it can be seen that resilience of the diaphragm provides an alternative means to attain dwell to permit timely valve shifting without fluid transfer from the cylinder. Note that there is no transfer of fluid between the chambers 109 and 111 separated by a non-perforated bellows. With adequate stiffness and appropriate fluid pressure differences, the diaphragm can function as a feed displacer similarly to the FIG. 1 piston means 25 but without fluid intermixing, and the rod means 106 functions also as a feed displacer rod.

FIG. 5

An alternative differential surge absorber 118 can be a direct substitution for the differential surge absorber 15 of FIG. 1. The absorber 118 has an alternative cylinder 119 communicating with conduit portions 41 and 42 of the outfeed conduit means 39, and with conduit portions 45 and 46 of the return conduit means 44. The surge absorber 118 has an alternative piston rod means 121 which cooperates with a flexible diaphragm or bellows 123 which is secured to the cylinder by a static seal 125 at one end thereof, and at an opposite end thereof to the piston rod means. The diapragm divides the cylinder 119 into a concentrate surge absorber chamber 129 and a feed surge absorber chamber 130. A spring 131 encircles the piston rod means 121 and functions similarly to the spring 72 of FIG. 1. Consideration relating to the substitution of the rigid piston means 25 of FIG. 1 for the diaphragm means 108 of FIG. 4, apply also to the structure of FIG. 5.

FIG. 6

An alternative flexible piston means or feed displacer 138 can be substituted for the sliding piston disc 32 in the feed cylinder 24 of FIG. 1, and cooperates with an alternative piston rod means for feed displacer rod 139. The piston rod means has a pair of spaced supports 141 and 142 having partially spherical surfaces 143 and 144 disposed oppositely to each other. A flexible disc 146 has a central bore to accept the rod means 139, and has shallowly, convexly curved opposite faces 147 and 148 when in an undeformed state, not shown, and has an outer periphery 149 of slightly larger diameter than bore of the cylinder. The periphery carries a hard wearing, low friction sealing ring 150 which projects from the periphery sufficiently to be in sliding and sealing engagement with cylinder walls. The disc is fitted between the supports and is thus deformed into a saucer-like shape by the cylinder. The disc is sufficiently flexible so that as the piston rod reverses its axial motion, inner portions of the disc flex to follow the rod movement whilst outer portions of the disc remain in static contact with the cylinder walls until limit of deformation of the disc is reached, at which time the periphery of piston disc slides on the cylinder walls. The piston is thus sufficiently compliant to permit, upon reversal of piston rod movement, movement of the piston rod means and adjacent portions of the disc a relatively large amount, typically between about 10 and 25 percent of total piston rod stroke, with negligible sliding of the sealing ring on the cylinder wall. The disc thus deforms so that travel of the outer rim is less than travel of the piston rod means. It can be seen that the piston disc deforms from an upwardly convex shape as shown when the piston travels downwards to a downwardly convex shape, shown in broken outline at 146.1, upon reversal of piston rod movement. This deformation of the disc occurs with negligible slippage of the disc relative to the walls. Thus, it can be seen that such a piston disc 146 serves in effect as a resilient, essentially plane diaphragm means carried on the piston rod means and has sufficient resilience to permit piston rod movement with negligible piston disc movement adjacent the outer periphery thereof and thus can provide dwell to permit timely valve shifting and approximate pressure equalization at valve ports.

A resilient piston disc as above described, when used with a rotating drive similar to the crankshaft 6 of FIG. 1, functions generally similarly to the sliding piston disc of FIG. 1 without the transfer of fluid between the expansion and pumping chambers. It can thus be considered to be a stiffer diaphragm that the bellows 108 of FIG. 4 and similarly permits the first valve means to open or close conduits only when pressure across the disc has been approximately equalized, thus reducing pressure differences at the valve ports with a corresponding reduction in erosion and valve gear wear.

It can be seen that the flexible piston disc 146 of FIG. 6, the floating piston disc 32 of FIG. 1 and the diaphragm or bellows 108 of FIG. 3 are generally equivalent feed displacers, and these can be defined as yieldable means associated with the displacer and the feed displacer rod to permit relative axial movement between a portion of the displacer and the displacer rod in response to reversal of pump action. The yieldable means provide a positive dwell which can be selected for a desired value and is particularly important when the apparatus is used for desalination of brine which has harsh properties of low viscosity, poor lubricity and corrosiveness. Other equivalent yieldable displacers can be substituted, and the above displacers and equivalents can be used in alternative pump means, further examples of which are described as follows. Thus the displacers circulate fluid and permit recovery of concentrate fluid energy, but do not act to compress or decompress the fluid. The feed displacer rods act as plungers to displace water from the membranes, increase or decrease pressure when the displacer is stationary, drive the displacer, and can cooperate with valve means as will be described with reference to FIG. 7.

FIG. 7

A triplex feed pump assembly 170 has a crankcase 172 and a crankshaft 173 having three throws or crank pins 175, 176 and 177, the shaft being journalled for rotation about an axis 179. In the description following, the crankshaft rotates in the direction of an arrow 181 and the three throws are spaced equally 120 degrees apart as in a conventional three-throw crankshaft.

The pump assembly 170 includes first, second and third feed cylinders 185, 186 and 187, corresponding to the throws 175, 176 and 177, each cylinder having first, second and third feed piston means or feed displacers 189, 190 and 191, having respective piston rod means or feed displacer rods 193, 194 and 195. The piston means are shown diagrammatically and can be generally similar to the sliding piston means or feed displacer 25 as shown in FIG. 1. Thus, for example, when considering the first piston means 189, a piston disc 192 is fitted between stops 196 on the rod means 193 and cooperates with the piston rod to permit relative axial movement between the disc and rod as previously described, or equivalent yieldable displacers can be substituted. Spacing 199 between oppositely facing faces of one of the stops 196 and the disc 192 defines relative movement between the piston rod means and piston disc. For three equally spaced cylinders, the spacing 199 is one-quarter of the stroke of the piston rod means, ie. half the crankshaft throw. This is because dwell angle for each cylinder is 60 degrees, as follows. Referring briefly to FIG. 2, the dwell angle D is an angular representation of the minimum spacing 199 or travel of the piston disc relative to the piston rod, ie. dwell angle D represents crankshaft rotation occuring without piston disc movement, and also the phase difference between first valve means and piston rod is $(90\pm(D)/2$ degrees.

$$\text{Minimum gap between piston and seat} = P - R$$
$$= \frac{P}{2}(1 + \cos D).$$

Referring again to FIG. 7, for three cylinders equally spaced, $$\text{cylinder spacing} = \frac{360}{3} = 120°$$
$$\text{nominal dwell angle} = (120° - 90°) \times 2 = 60°.$$

For 'n' cylinders $$\text{nominal dwell } D = 2\left(\frac{360}{n} - 90\right)°.$$

The nominal dwell is fixed by the phasing between the crank throws, eg. number of cylinders. The actual dwell selected may be slightly greater and is dependent on valve design, tolerances, etc. By simple geometry, a 60 degree dwell interval represents one-quarter of piston rod stroke.

Each piston means divides the respective cylinder into a pumping chamber and an expansion chamber, so that the first cylinder 185 has first pumping and expansion chambers 197 and 198, the second cylinder 186 has second pumping and expansion chambers 200 and 201, and the third cylinder has third pumping and expansion chambers 203 and 204 respectively. The piston rod means of each cylinder extends through the expansion chamber to cooperate with the respective throw, that is the rotational drive means, in such a manner as will be described so that three piston means are phased 120 degrees apart.

The first, second and third cylinders 185 through 187 have respective first, second and third valve spools 205, 206 and 207 and first, second and third valve chambers 210, 211 and 212 respectively, each spool being reciprocable within the respective valve chamber. The valve spools have inner ends directly connected to the respective piston rod means and outer ends cooperating with respective connecting means 215, 216 and 217 which themselves cooperate with the respective crank throws. The spools are aligned with and rigidly connected to, but can be integral with, the respective piston rods and reciprocate concurrently with the respective piston means. The connecting means are shown diagrammatically and can be links hinged to the outer ends of the spools, as shown in FIG. 1, so as to interconnect the throw and spool, or other equivalent connecting means to accommodate the lateral movement of the throw can be incorporated, or clearly cam means or equivalent rotary drive means can be substituted.

Conduit means and associated equipment cooperating with the feed pump are generally similar to those as previously described and are discussed briefly as follows. Inlet conduit means 221 extend from a feed fluid supply 222 through undesignated connecting conduits having similar inlet check valves 225 to communicate with the pumping chambers 197, 200 and 203 of the feed cylinders. Outfeed conduit means 227 connect the pumping chambers through outfeed check valves 229 and a filter 231 to a membrane pressure vessel 233. A hydraulic accumulator 235 to reduce pressure and flow fluctuations across the membranes, and a pressure relief valve 236 to control maximum system pressure, are incorporated in the outfeed conduit means 227. A permeate conduit 238 discharges permeate fluid from the membranes, and a concentrate return conduit means 240 extends between the membranes and the feed pump assembly 170 to return concentrate fluid to the feed pump.

It can be seen that the inlet conduit means 221 communicate the feed fluid supply with the respective pumping chambers to admit feed fluid into the pumping chambers, and the outfeed conduit means 227 communicate each pumping chamber with the membrane means so as to conduct pressurized feed fluid from the pumping chambers to the membrane means. The check valves 225 and 229 serve as the second valve means communicating with the inlet and outfeed conduit means to control direction of feed fluid fed into and out from the pumping chambers. As will be described, the valve spools within the respective valve chambers serve as first valve means 230 to direct concentrate fluid as required.

Inner ends of the valve chambers 210, 211 and 212 are interconnected by concentrate fluid return conduit portions 242 which communicate with the return conduit means 240. Outer ends of the valve chambers are interconnected by exhaust conduit portions 244 which communicate with a final exhaust conduit 245. Intermediate concentrate fluid conduit means 247 and 248 extend between an intermediate portion of the first and second valve chambers 210 and 211 to connect with the second and third expansion chambers 201 and 204 respectively. An intermediate concentrate fluid conduit means 249 extends from an intermediate position of the third valve chamber 212 to connect with the expansion chamber 198 of the first cylinder, it being noted that this conduit means is shown broken and routed diagrammatically and is equivalent to the interconnections between the previously described valve chambers and expansion chambers. Thus, it can be seen that each valve chamber has at one end thereof an intermediate concentrate fluid conduit means interconnected to the concentrate fluid return conduit means 240, and an opposite end thereof interconnected exhaust fluid conduit means. Adjacent an intermediate position between ends of the valve chamber, intermediate concentrate fluid conduit means interconnect the valve chamber of one cylinder with the expansion chamber of one of the remaining cylinders. Thus, in effect, the return conduit means 240 communicates the membrane means with the expansion chambers of each cylinder so as to conduct the concentrate fluid fraction from the membrane means to the expansion chambers of the feed cylinders. It can be seen that, in view of the phase difference between the cylinders, there is a phase difference between each valve and its respective cylinder of 120 degrees in the same direction of rotation.

Each valve spool has a valve land with spaced seals and is subjected to reciprocation in the cylinder to close off the intermediate conduit portions while permitting fluid connections between the adjacent concentrate return conduit portions and exhaust conduit portions. At a particular instant, as shown in FIG. 7, the first valve spool 205 of the first valve chamber 210 is in an intermediate position, and the intermediate concentrate fluid conduit 247 is closed; the second valve spool 206 is positioned to maintain the conduit means 248 open to exhaust depressurized concentrate fluid from the expansion chamber 204 of the third cylinder, and the third spool 207 is positioned to maintain the conduit means 249 open to direct pressurized concentrate fluid from the membrane means into the expansion chamber 198 of the first cylinder 185. The valve spools and piston rod means are shifting in the directions shown by undesignated arrows. Upon inspection of FIG. 7, it can be seen that the first cylinder 185 is experiencing a pumping stroke, the second cylinder 186 is experiencing a dwell interval, and the third cylinder 187 is experiencing an induction stroke.

The operation of the triplex feed pump 170 can be seen to be a combination of three single feed cylinder pumps with energy recovery derived from the returning concentrate fluid means. The feed pumps are phased equally apart in a complete revolution and it can be seen that the first valve means of each cylinder is a slidable valve spool connected rigidly to the respective piston rod means, so that the valve spool connected to one piston rod means controls the direction of pressurized concentrate fluid flow from the membrane means to the expansion chamber of one of the remaining two feed cylinders. Feed fluid flow over the membrane means is characterized by three distinct pressure pulses of fluid during each revolution of the crankshaft, which, at suitable crankshaft RPM, essentially eliminates stagnant flow conditions and also permits reduction in the size of the accumulator 235, or in the differential surge absorber used in the single-cylinder arrangement. There would also be a reduction in torque demand fluctuations on the crankshaft when compared with the single-cylinder embodiment of FIG. 1.

The triplex pump is shown with three feed cylinders cooperating with a crankshaft having three throws. In further alternatives, additional cylinders can be incorporated into the same crankcase, for example a quintuplex feed pump, and driven by a crankshaft having an appropriate number of throws. If desired, the number of feed cylinders used can be expanded in a manner similar to the multi-cylinder internal combustion engine, so as to be generally similar to radial engines having one or more banks of cylinders. The arrangement of inlet, outfeed and return conduit means is generally similar to that as described, and the first valve means, ie. the spool valves or equivalent, will cooperate with the rotatable drive means so that the respective first valve means of each cylinder is phased relative to the drive means to provide a desired dwell interval between valve actuation and piston means movement. This can be attained without complex timing mechanism in a manner equivalent to that as previously described so that the valve means associated with the one cylinder directs concentrate fluid to and from another cylinder, not necessarily an adjacent cylinder but a cylinder phased so as to be at a desired dwell. In the multi-cylinder embodiments envisaged with two or more banks of radially disposed cylinders, there could be an interconnection between the valves on one bank with the cylinders on an adjacent bank. Clearly, many combinations are possible and in particular, for valve phasing as above described, the total number of cylinders in a cooperating set would be factored by an integral odd number greater than one. Particularly desirable numbers of cylinders are 3 and 5 cylinder embodiments as exemplified, and these can be combined in two banks of totals of 6 and 10 cylinders respectively. Because of the need for substantial dwell, the above definition excludes feed pumps having total numbers of the cylinders such as 2, 4, 8, 16, etc. which would result in a phase difference of 90 degrees or 180 degrees which would be unsuitable for providing dwell when using spool valves integral with piston rod means.

FIG. 8

A third embodiment of the pumping apparatus includes a recirculating pump apparatus 261 having a feed cylinder 263, a feed piston means 264 and a feed piston rod means 265, the feed piston means dividing the feed cylinder into a pumping chamber 267 and an expansion chamber 268. The feed piston means 264 is thus a feed displacer mounted on a feed displacer rod for axial movement relative to the rod of one-quarter of the stroke of the feed cylinder, similarly to the feed piston means of FIG. 7. A crankshaft, not shown, having a central axis 270, has a first throw cooperating with connecting means 271 to reciprocate the piston rod means 265 in a manner similar to that previously described.

The apparatus 261 includes first and second recirculating cylinders 275 and 276 having respective first and second recirculating piston means 279 and 280 reciprocable therein. The piston means 279 and 280 have recirculating piston rod means 281 and 282 connected thereto, and divide the first and second recirculating cylinders into first front and first rear chambers 285 and 286, and second front and second rear chambers 287 and 288 respectively. The piston means 279 and 280 also serve as recirculating displacers and primarily displace fluid without material pressure increase as will be described. The recirculating piston rod means are thus recirculating displacer rods and extend through the respective rear chambers of the recirculating cylinders and are sealed against leakage.

The recirculating piston means 279 and 280 have similar internal fluid transfer means 283 and 824 respectively, which are adapted to permit passage of fluid from the rear cylinders to the front cylinders thereof upon return strokes of the recirculating piston means. The piston means 279 includes piston disc 289 sandwiched for axial movement between spaced inner and outer piston disc stops 290 and 291. The piston disc has a central bore 292 and the outer stop 291 has a plurality of transfer bores 293 which are spaced radially of the rod means 281 to permit registration with the central bore 292 when the disc 289 is against the outer stop as shown. In this position there is sufficient clearance 294 between the inner stop and the disc to permit fluid flow between the chambers 285 and 286 by passing through the bores 293, the bore 292 and the clearance 294 upon a return stroke. The slidable disc and bores serve as the concentrate fluid transfer means 283 and the transfer means 284 for the piston means 280 is similar. Note that, as shown, the means 284 is executing a pumping stroke and the piston disc thereof is adjacent the inner stop and the central bore of the disc is closed by the inner stop, thus preventing fluid transfer. The recirculating piston discs are thus valved for transferring fluid in one direction, and concentrate fluid transfer means include transfer conduit and transfer valve means. It can be seen that the valved piston means functions similarly to a cup washer plunger as used in common bicycle pump and alternative valved piston means can be substituted, one alternative being described with reference to FIG. 10. The rod means 281 and 282 cooperate with rod connecting means 295 and 296 respectively mounted on throws of the crankshaft in a manner similar to the connecting means 271. The crankshaft, which thus serves as the rotatable drive means, cooperates with the recirculating piston rod means so that the recirculating cylinders are phased equally from the feed cylinder.

Inlet conduit means 297 communicate with the pumping chamber 267 of the feed cylinder through an inlet valve means 298 and admit feed fluid from a feed source 300 into the feed cylinder. Outfeed conduit means 302 communicate the pumping chamber through an outfeed check valve 304 and a filter 305 to a membrane pressure vessel 306. A hydraulic accumulator 308 and pressure relief valve 309 communicate with the outfeed conduit 302 as before. A permeate discharge conduit 311 and a concentrate return conduit 312 discharge permeate and concentrate fluid fractions respectively from the membrane vessel, the conduit 312 communicating with the first rear chamber 286 of the first recirculating cylinder 275.

First and second recirculating conduit portions 313 and 314 communicate with a main recirculating conduit means 315 which communicates with the membrane means so as to be mixed with feed fluid in the outfeed conduit 302. Similar concentrate outfeed check valves 316 are provided in each conduit portion 313 and 314 to control direction of concentrate fluid flow to the membranes. The conduits 313 through 315 thus serve as recirculating conduit means extending from the forward chambers of the recirculating cylinder to the membrane means, and the outfeed valves 316 serve as recirculating valve means.

The piston rod means 282 of the second recirculating cylinder 276 has a first valve means 317 having a valve spool 318 which also is, in effect, integral with the piston rod means and has fluid seals spaced at opposite ends of a portion of reduced diameter 319, the reduced diameter portion providing clearance for fluid transfer to permit interconnection of valve ports. The piston rod 282 is slidable in a bore 320 which serves as a valve chamber for the valve spool 318. The reduced diameter portion 319 is positioned on the piston rod so that when the piston rod is adjacent a top dead center position thereof, the spool 318 is in a first position, not shown, in which an upper portion of the reduced diameter portion enters the rear chamber 288 to provide access from the chamber 288 to the valve chamber or bore 320.

A first intermediate concentrate conduit means 324 extends between the first and second rear chambers 286 and 288, and a second intermediate concentrate conduit means 326 extends from the bore 320 to communicate with the expansion chamber 268 of the feed cylinder 263. An exhaust conduit portion 328 extends from the bore 320 to waste, to vent or exhaust depressurized concentrate fluid as will be described. The conduits 326 and 328 are positioned so that when the spool 318 is in a second position, as shown in FIG. 8, the reduced diameter portion 319 extends between the conduits 326 and 328 to interconnect these conduits so that depressurized concentrate fluid can pass from the expansion chamber 268 to the exhaust conduit portion 328. In the first position of the spool, which is not shown, pressurized concentrate fluid from the rear chamber 288 passes into the chamber 320, into the conduit 326, and then into the expansion chamber 268. A third position of the valve means, also not shown, is a closed center position in which flow through the chamber 320 is zero. The first valve means 317 thus cooperates with a rear chamber 288 of the recirculating pump cylinder 280, the first and second intermediate concentrate conduit portions 324 and 326, and the exhaust conduit portion 328. The valve spool 318 is reciprocable within the valve chamber 320 and is connected to the piston rod means of one of the recirculating cylinders so as to be phased at 120 degrees from actuation of the feed cylinder.

Thus, in summary, it can be seen that the return conduit means includes a first intermediate concentrate conduit means extending between the rear chambers of the recirculating cylinders to the first valve means 317 so that the first valve means communicates with at least one rear chamber. Also the second intermediate concentrate conduit means 326 extends from the first valve means to the expansion chamber 268 of the feed cylinder to direct pressurized concentrate fluid from the rear chambers of the recirculating cylinders into the expansion chamber of the feed cylinder. When the first valve means shifts, the second intermediate concentrate conduit portion 326 and the exhaust conduit portion 328 communicating with the valve chamber 320 are interconnected and depressurized concentrate fluid is exhausted from the expansion chamber 268 of the feed pump means.

Similarly to the differential surge absorber 15 of the FIG. 1 embodiment, the recirculating cylinders 275 and 276 have a preferred relationship between swept volume of the piston means and swept volume of the piston rod means. To achieve the most uniform permeate fluid flow rates and the most uniform torque demand for each revolution of the crankshaft, the piston rod means 281 and 282 of the recirculating cylinders each have displacements of about one-half of the displacement of the piston rod means 265 of the feed cylinder 263. Fluid flow rates and torque demand are discussed in greater detail with reference to FIG. 9.

In operation of the pump apparatus 261, the feed cylinder 263 of the apparatus 261 functions similarly to a single feed cylinder and, through the conduit 302, delivers feed fluid at membrane operating pressure to the membrane means 306. Concentrate fluid rejected by the membranes returns through the conduit 312 and enters the rear chambers 286 and 288 of the recirculating cylinders in which the respective recirculating pistons are reciprocating so as to be phased 120 degrees apart relative to the feed cylinder. Similarly to the single embodiment, on a feed cylinder pump stroke, a portion of the concentrate fluid is depressurized in the expansion chamber 268 to permit recovery of some pressure energy in the concentrate fluid. When the concentrate fluid enters a rear chamber of a recirculating cylinder executing a power stroke, pressure of the concentrate fluid acts on the piston and assists in returning the concentrate fluid to the membrane means. At the instance shown in FIG. 8, the piston means of the recirculating cylinder 275 and 276 are experiencing return and pumping strokes respectively, and the feed cylinder is terminating an induction stroke whilst exhausting depressurized concentrate fluid from the expansion chamber.

FIG. 9

The graph of FIG. 9 represents graphically the rate of net fluid displacement into and out from the high pressure circuit assuming zero friction and pressure drops, and also represents crankshaft torque demand. The membrane means are subjected to two pulses of fluid displaced by the piston rods per revolution of the crankshaft, the pulses being shown as approximate sinusoidal functions as seen by the membranes when the effects of the accumulator, compressibility and flow losses are ignored. The displacements of the three displacers are assumed equal. A first pulse or curve 330 represents flow displaced by piston rod of the feed cylinder 263, with an irregularity 331 at the beginning of flow build-up representing an initial slow start due to the 60 degree dwell of the piston means. If there were no dwell in the feed cylinder, the curve would approximate more closely to a sinusoid as shown theoretically at 332. The pulse 330 is followed about 120 degrees later by a second pulse or curve 333 of concentrate fluid displaced by piston rod of the recirculating cylinder 276 which is followed about 120 degrees later by a third pulse or curve 334 of concentrate fluid displaced by the piston rod of the recirculating cylinder 275. A combined final or total curve 335 represents the algebraic sum of the three curves on the feed face of the membranes. As the total fluid flow past the membranes is determined by the displacers rather than the piston rods of the three cylinders, the circulation velocity will have three pulses per revolution like a conventional triplex pump. The two pulses per revolution from the recirculating cylinders result in surges of pressurized concentrate fluid across the membranes, which reduce concentration polarization effects that might otherwise occur due to flow stagnation before the feed cylinder delivers a following pulse of feed fluid. The pulses are shown to be generally sinusoidal in pressure and flow changes, and, because the pulses are spaced only 120 degrees apart, the diminishing flow from one pulse is augmented by an increasing flow from a following pulse thus reducing fluctuations.

The description above refers to approximate volume flow rates of fluid experienced on the pressurized membrane face, but it could also be considered as a representation of torque demand on the crankshaft, as follows.

The feed cylinder 263 demands maximum torque, on a pumping stoke, eg. about 60 degrees on either side of 90 degrees whilst displacing feed fluid into the high pressure circuit, ie. the conduits associated with the membrane vessel. Simultaneously, the recirculating cylinders are phased so that their combined action withdraws displacement volume out of the high pressure circuit, ie. the recirculating piston rods are retracting to occupy less volume. In effect the recirculating cylinders are motoring or being driven so that each accepts about onehalf of the displacement of the feed cylinder piston rod, and thus the recirculating cylinders are effectively supplying torque to the crankshaft to assist in a feed cylinder pumping stroke.

The feed cylinder 263 demands little torque during an induction stroke, ie. about 60 degrees on either side of 270 degrees, and is disengaged from the high pressure circuit. However, the combined effect of the recirculating piston rod means is now to discharge fluid and to displace the previously withdrawn fluid volume back into the high pressure circuit. Thus the fluid accepted in the previous half is re-admitted into the high pressure circuit making a torque demand in the crankshaft. This is the instant shown in FIG. 8 and is indicated on the graph of FIG. 9.

When expressed mathematically, average net flow displaced by the pump into the high pressure circuit = (-Flow in outfeed conduit 302) + (Flow in main recirculating conduit 315) − (Flow in return conduit 312) = approximate flow in permeate conduit 311.

Thus the pair of recirculating cylinders are coupled to, and phased equally apart from, the feed cylinder so that the two pulses of re-cycled concentrate fluid are phased equally from each main pulse of feed fluid to reduce fluid pressure and flow fluctuations across the membranes, reducing fluctuations in the torque requirement for the drive means and resulting in smoothing of permeate fluid discharges from the membranes.

FIG. 10

An alternative recirculating piston means 337 has a piston disc 338 mounted rigidly at an outer end of a piston rod means 339 and reciprocates in the recirculating cylinder 275. The disc has a plurality of transfer conduits 340 passing therethrough and a peripheral seal 341 to seal the wall of the respective recirculating cylinder. Each transfer conduit has a respective transfer valve 343, which is a flapper valve hinged at 344 to seal or open the respective transfer conduit in response to fluid pressure.

In operation, on a return stroke, the valves 343 are opened and pressurized concentrate fluid passes from the rear chambers 286, through the conduits 340 into the front chamber 285. On a forward stroke, the valves 343 are forced closed to seal the transfer conduits and the piston operates as a conventional piston. Clearly the piston disc 338 and the rod 339 are an alternative recirculating displacer and a recirculating displacer rod respectively, and are equivalent to displacer 279 and rod 281 of FIG. 8.

FIG. 11

An alternative recirculating pump 350 has a triplex cylinder crankcase 351 very similar to that as shown in FIG. 8. The crankcase cooperates with conduits in associated apparatus and briefly includes inlet, outfeed and concentrate return conduits 352, 353 and 354 cooperating with a source of feed fluid and membrane pressure vessel means as before. Also, first and second recirculating conduits 355 and 356 containing recirculating valves 357 are provided and function in a manner generally similar to that as described in the reference to FIG. 8.

The pump 350 has a feed cylinder 360 with a feed piston means or feed displacer 361 and a feed piston rod means or feed displacer rod 362 similar to the previous embodiment, the piston means dividing the cylinder into the pump and expansion chamber 363 and 364 respectively. The apparatus has first and second recirculating cylinders 365 and 366 fitted with first and second recirculating piston means or displacers 367 and 368 mounted on first and second recirculating piston or displacer rods 369 and 370. The first and second recirculating pistons divide the respective cylinders into first, front and rear chambers 371 and 373, and second, front and rear chambers 373 and 374 respectively. The three piston rod means cooperate with a three throw crankshaft similar to that previously described, and the feed piston means 361 is generally similar to the piston means 264 of the previous embodiment. A main difference between the pump 261 of FIG. 8 and the pump 350 of FIG. 11 is that the recirculating means cooperating with the recirculating cylinders uses external transfer conduits and transfer valve means, as opposed to the transfer conduits and valve means integral with the recirculating piston means 279 and 280 of FIG. 8.

The recirculating piston means 367 and 368 have generally conventional piston discs fitted rigidly on the piston rod means 369 and 370 and are not free for axial sliding or perforated for fluid transfer as in the FIGS. 8 and 10 embodiments. Instead, the recirculating cylinders cooperate with first and second transfer conduits 377 and 378 which extend from the first and second recirculating conduits 355 and 356 respectively and are connected to the concentrate return conduit 354. Each transfer conduit connects with the respective recirculating conduit between the respective recirculating cylinder and the valve 357, and has a respective similar transfer valve 376 which cooperates with the respective conduit to direct fluid from the rear chamber of the recirculating cylinder to the respective front chamber on a return stroke of the recirculating piston. Thus the transfer valves and conduits transfer concentrate fluid from the rear to the front chambers of the recirculating cylinders equivalently to transfer means of the FIG. 8 embodiment.

The pump 350 has a first valve means 380 which is a poppet valve means having first and second poppet valves 381 and 382 extending into a valve chamber 383, the valves having valve actuating means, not shown, eg. a camshaft and followers, which are coupled to the crankshaft, not shown, so as to be synchronized therewith. The valves are shown to be spring-closed but equivalents can be substituted. A first intermediate concentrate conduit means 387 has two portions which connect together the rear chambers 372 and 374 of the recirculating cylinders and communicate with the first poppet valve 381 to pass fluid into the valve chamber 383. A second intermediate concentrate conduit means 390 extends from the expansion chamber 364 of the feed cylinder to communicate with the valve chamber 383. An exhaust conduit 392 communicates with the second poppet valve 382 to exhaust depressurized concentrate fluid. With suitable poppet valve actuation, the first valve means can be seen to direct concentrate fluid to the expansion chamber 364 from the recirculating cylinders and from the expansion chamber to exhaust, and, similarly to the previously described first valve embodiments, at no time are both poppet valves open.

In operation of the pump 350, the pressurized concentrate fluid flow generally follows that of the previously described embodiment, with the exception that the transfer flow from the concentrate fluid recirculating cylinders, ie. from rear to front chambers of the recirculating cylinders, is external of the piston means. Also, the poppet valve means can be operated by a camshaft to actuate exactly as desired, and clearly, when compared with the spool valve of the previously described embodiment, a greater flexibility in poppet valve timing can be attained and this may have advantages in some circumstances. Also, for simplicity, the transfer valve means 376 in the recirculating conduit means can be adjusted conveniently externally of the apparatus, which contrasts with the relatively inconvenient internal adjustment for the valve means in the FIG. 8 embodiment.

One aspect of a cam controlled poppet valve used in the first valve means is that the greater valve timing flexibility permits use of a single recirculating cylinder. Whilst this is not illustrated, clearly a feed pump having one feed cylinder and one recirculating cylinder can be devised, but a spool type first valve means mounted on piston rod means would not provide suitable dwell as described above. Thus a cam operated first valve means or independently timed equivalent valve would be used in the two cylinder embodiment.

In summary, the pump apparatus 350 has a poppet valve first valve means communicating with a rear chamber of at least one recirculating cylinder and first and second intermediate concentrate conduit means. The first valve means cooperates with the reciprocating drive means so as to be phased apart from the actuation of the feed cylinder. The first and second intermediate concentrate conduit means communicate the rear chambers of the recirculating cylinders with the expansion chambers of the feed cylinder, and are closed after completion of a pumping stroke of the feed cylinder piston rod means and are opened prior to commencing an induction stroke of the piston rod means of the feed cylinder.

When considering the relative advantages of the triplex feed pump of FIG. 7 and the recirculating feed pumps of FIGS. 8 and 11, it is considered that a triplex feed pump operating on a 20 percent recovery ratio would be suitable for larger units of 4000 liters per day and upwards. This is assuming the pump feed membranes having relatively long flow paths such as found with spiral wound or hollow fiber membranes. For a much smaller unit using a triplex feed pump at 20 percent recovery ratio, the flow would be to slow to avoid concentration polarization and thus a recirculating feed pump would be preferred to provide higher flow rates without use of extremely low recovery ratios, thus reducing pumping losses.

I claim:

1. A pumping apparatus for a membrane separation apparatus for separation of a feed fluid into permeate fluid and concentrate fluid fractions which respectively are permeated and rejected by selective membrane means, the pumping apparatus being characterized by:
   (a) a reciprocating feed pump means having a feed cylinder, a feed displacer and a feed displacer rod, the feed displacer dividing the feed cylinder into a pumping chamber in which the feed fluid is pressurized and an expansion chamber in which the concentrate fluid fraction is depressurized, the displacer cooperating with the displacer rod extending through the expansion chamber with sealing means to prevent leakage of fluid from the cylinder, the cylinder and displacer rod having relative diameters which define cylinder/displacer rod proportions such that ratio of swept volume of displacer rod to swept volume of the displacer determines in part recovery ratio of permeate fluid fraction to total feed fluid flow,
   (b) inlet conduit means communicating with the pumping chamber to admit feed fluid into the pumping chamber,
   (c) outfeed conduit means adapted to communicate the pumping chamber with the membranes so as to conduct pressurized feed fluid from the pumping chamber to the membranes,
   (d) return conduit means adapted to communicate the membranes with the expansion chamber so as to conduct the concentrate fluid fraction from the membranes to the expansion chamber,
   (e) means communicating with the outfeed and return conduit means to reduce fluctuations in pressure and fluid flow across the membrane means,
   (f) first and second valve means, the first valve means communicating with the expansion chamber and having a closed intermediate position between first and second positions, the second valve means being non-return valve means communicating with the pumping chamber, the first and second valve means cooperating with the conduit means so as to direct fluid flow from a feed fluid source, and to and from the membrane means, and to exhaust depressurized concentrate fluid fraction from the expansion chamber,
   (g) rotatable drive means activating the feed displacer rod and the first valve means whilst maintaining a phase angle difference between the feed displacer stroke and first valve means actuation,
   (h) dwell means associated with the pump means and the drive means to ensure that the first valve means is shifted across the closed intermediate position thereof during an interval of essentially zero fluid transfer from the cylinder by the displacer after the beginning of each stroke of the displacer rod, the dwell means being characterized by a yieldable means associated with the feed displacer and the displacer rod to permit relative axial movement between a portion of the feed displacer and the feed displacer rod in response to reversal of pump action, and cooperation between the feed displacer and drive means being such that there is a dwell interval between valve actuation and displacer movement sufficient to approximately equalize pressure differences across ports of the first valve means that are about to be opened prior to opening of such ports,
so that in a first position of the first valve means, pressurized feed fluid from the pumping chamber is fed to the membranes through the second valve means while pressurized concentrate fluid is discharged into the expansion chamber through the first valve means, so that depressurization of the concentrate fluid returning from the membrane means assists in pressurizing of the feed fluid, and in a second position of the first valve means depressurized concentrate fluid is exhausted from the expansion chamber through the first valve means while feed fluid is inducted into the pumping chamber through the second valve means.

2. Pumping apparatus as claimed in claim 1 in which the yieldable means associated with the feed displacer is characterized by:
   (a) the feed displacer rod being a piston rod means having a pair of spaced stop means,
   (b) the feed displacer having a piston disc with a bore accepted as a sliding fit on the piston rod, the piston disc being interposed between the stop means, space between the stop means and thickness of the disc permitting relative axial sliding between the disc and the piston rod limited by the stop means,
so that stroke of the piston rod means is greater than stroke of the piston means to permit timely valve shifting.

3. Pumping apparatus as claimed in claim 2 further characterized by:
   (a) sufficient clearance existing between the bore of the piston disc and the piston rod means to permit transfer of fluid between the piston disc and the piston rod means.

4. Pumping apparatus as claimed in claim 1 in which the displacer, displacer rod and dwell means are characterized by:
   (a) flexible diaphragm means attached to piston rod means and separating the pump chamber from expansion chamber,
so that resilience of the diaphragm provides dwell to permit timely valve shifting.

5. Pumping apparatus as claimed in claim 1 in which the yieldable means associated with the feed displacer and displacer rod are characterized by:
   (a) a flexible dished piston disc mounted on a piston rod means, the disc deforming such that travel of an outer rim thereof is less than travel of the piston rod means.

6. Pumping apparatus as claimed in claim 1 further characterized by:
   (a) the displacer being a piston means which is vented and has passage means to permit transfer of fluid across the piston means between the pumping chamber and the expansion chamber.

7. Pumping apparatus as claimed in claim 1 in which the drive means for the pump means and the dwell means is characterized by:
   (a) a rotating shaft having displacement and dwell means cooperating therewith so that after the first valve means has been shifted to attain one of the first or second positions thereof, the direction of displacement of the feed displacer is reversed to transfer fluid to and from the feed cylinder.

8. Pumping apparatus as claimed in claim 7 further characterized by:
   (a) the rotating shaft having crank throws and respective rod connecting means coupled to the displacer rod and first valve means respectively, the throws being spaced apart so as to provide the desired phase difference between the valve actuation and pump stroke.

9. A pumping apparatus as claimed in claim 1 further characterized by:
   (a) a plurality of feed cylinders where the number of cylinders in a cooperating set is factored by an odd number greater than one, each cylinder having respective feed displacers reciprocable within the respective cylinders, each feed displacer dividing the respective cylinder into a pumping chamber and an expansion chamber, each displacer having a displacer rod extending through the expansion chamber to cooperate with the rotatable drive means in such a manner that the feed displacers are phased angularly equally apart,
   (b) the inlet conduit means communicating with respective pumping chambers to admit feed fluid into the pumping chambers.
   (c) the outfeed conduit means communicating each pumping chamber with the membrane means so as to conduct pressurized feed fluid from the pumping chambers to the membrane means,
   (d) the second valve means communicating with the inlet conduit means and the outfeed conduit means to control direction of feed fluid fed into and out from the pumping chambers,
   (e) return conduit means communicating the membrane means with the expansion chambers of each cylinder so as to conduct the concentrate fluid fraction from the membrane means to the expansion chambers,
   (f) the first valve means cooperating with the rotatable drive means so that the valve means of each cylinder is phased at a dwell angle relative to the drive means of the respective cylinder to provide the desired dwell interval between respective valve actuation and corresponding feed displacer movement.

10. A pumping apparatus as claimed in claim 9 further characterized by:
    (a) the first valve means of each cylinder is actuated by a displacer rod means of another cylinder separated by a phase angle which differs from 90° by half of the dwell angle.

11. A pumping apparatus as claimed in claim 1 in which the reciprocating feed pump means has a first feed cylinder and the means (e) is further characterized by:
    (a) second and third similar feed cylinders, each cylinder means having a respective feed displacer reciprocable within the respective cylinder, each feed displacer dividing the respective cylinder into a pumping chamber and an expansion chamber, each feed displacer having a feed displacer rod extending through the respective expansion chamber to cooperate with the rotatable drive means in such a manner that the three rods are phased one hundred and twenty degrees apart,
    (b) the inlet conduit means communicating with respective pumping chambers to admit feed fluid into the pumping chambers,
    (c) the outfeed conduit means communicating each pumping chamber with the membrane means so as to conduct pressurized feed fluid from the pumping chambers to the membrane means,
    (d) the second valve means communicating with the inlet conduit means and the outfeed conduit means to control direction of feed fluid fed into and out from the pumping chambers,
    (e) return conduit means communicating the membrane means with the expansion chambers of each cylinder so as to conduct the concentrate fluid fraction from the membrane means to the expansion chambers,
    (f) the first valve means cooperating with the rotatable drive means so that the first valve means of each cylinder is phased relative to the drive means to provide a nominal dwell interval of approximately sixty degrees between valve actuation and displacer movement to effect fluid transfer.

12. A pumping apparatus as claimed in claim 9 or 11 further characterized by:
    (a) the first valve means of each feed cylinder being a slidable valve spool connected with the respective feed displacer rod so that the valve spool connected to the displacer rod of one cylinder controls the direction of pressurized concentrate fluid flow from the membrane means to the expansion chamber of one of the remaining feed cylinders.

13. A pumping apparatus as claimed in claim 11 in which the rotatable drive means is a crankshaft having three crank throws spaced apart at phase angles of one hundred and twenty degrees, each crank throw cooperating with a respective rod connecting means to reciprocate concurrently the respective spool and associated feed displacer rod.

14. A pumping apparatus as claimed in claim 11 or 13 further characterized by:
    (a) the first, second and third feed cylinders having respective first, second and third valve spools and valve chambers, each spool being reciprocable within the respective valve chamber and rigidly connected to the respective feed displacer rods,
    (b) each valve chamber having at one end thereof interconnected concentrate fluid return conduit means, at an opposite end thereof interconnected exhaust fluid conduit means, and adjacent an intermediate position between ends of the chamber an intermediate concentrate fluid conduit means interconnecting the valve chamber of one cylinder with an expansion chamber of one of the remaining cylinders, so that phase difference between each valve and its respective cylinder is about 120 degrees in the same direction of rotation,
    so that at a particular instant when the first valve of the first valve chamber is in an intermediate position, the intermediate concentrate fluid conduit of the first valve chamber is closed, the second spool is positioned to exhaust depressurized concentrate fluid from the expansion chamber of the third cylinder, and the third spool is positioned to direct pressurized concentrate fluid from the membranes into the expansion chamber of the first cylinder.

15. A pumping apparatus as claimed in claim 1 in which the means to reduce fluctuations in pressure and feed fluid flow across the membrane means is characterized by:
    (a) a recirculating cylinder having a recirculating displacer reciprocable therein and a recirculating displacer rod connected therewith, the recirculating displacer dividing the cylinder into front and rear chambers, the recirculating displacer rod extending through the rear chamber, the front chamber communicating with the membrane means, and the rear chamber communicating with the expansion chamber of the feed cylinder, (b) recirculating conduit means, and transfer conduit means, and valve means cooperating with the recirculating cylinder to direct concentrate fluid from the front chamber to the membranes on a pumping stroke of the recirculating cylinder, and to direct concentrate fluid from the rear chamber to the front chamber on a return stroke of the recirculating cylinder, (c) the rotatable drive means cooperating with the recirculating displacer rod so that the recirculating cylinder is phased equally from the feed cylinder, (d) the first valve means is connected to the drive means and is phased at a desired phase angle from the feed cylinder, and communicates with the rear chamber of the recirculating cylinder and the expansion chamber of the feed cylinder.

16. A pumping apparatus as claimed in claim 15 in which the first valve means is further chracterized by:

(a) poppet valve means communicating with the rear chamber of the recirculating cylinder and the intermediate concentrate conduit means, and cooperating with the rotatable drive means so as to be phased equally from the actuation of the feed cylinder, so that the concentrate conduit means connect the rear chamber of the recirculating cylinder with the expansion chamber of the feed cylinder for a pumping stroke of the feed cylinder to direct pressurized concentrate fluid into the expansion chamber and the second intermediate conduit means connects the expansion chamber to exhaust for an induction stroke of the feed cylinder.

17. A pumping apparatus as claimed in claim 15 or 19 in which the transfer valve means and transfer conduit means are characterized by:

(a) the recirculating displacer rod being a recirculating piston rod means having spaced apart inner and outer piston disc stops, the outer stop having transfer bore means extending therethrough and spaced radially of the piston rod means, (b) the recirculating displacer being a recirculating piston means having a piston disc having a central bore accepting and being slidable on the piston rod means between the spaced stops, so that on a return stroke of the recirculating piston means when the disc is adjacent the outer stop, the transfer bore means of the outer piston disc stop are registrable with the central bore of the piston disc and sufficient clearance exists between the inner disc stop and the piston disc to permit fluid flowing between the chambers to pass through the central bore and transfer bore means, and on a pumping stroke of the recirculating piston means the central bore of the piston disc is sealed against the inner disc stop.

18. A pumping apparatus as claimed in claim 15 or 19 in which the transfer valve means and transfer conduit means are characterized by:

(a) the recirculating displacer being a recirculating piston disc mounted rigidly adjacent an outer end of a recirculating piston rod means, the disc having transfer conduit means passing therethrough, (b) transfer valve means adapted to seal or open the transfer conduit means in response to fluid pressure, so that on a pumping stroke of the recirculating piston disc the transfer valve means closes the transfer conduit means, and on a return stroke the transfer valve means opens the transfer conduit means.

19. A pumping apparatus as claimed in claim 1 in which the means to reduce fluctuations in pressure and feed fluid flow across the membrane means is characterized by:

(a) at least two recirculating cylinders, each cylinder having a respective recirculating displacer reciprocable therein and a recirculating displacer rod connected therewith, each recirculating displacer dividing its cylinder into respective front and rear chambers, the recirculating displacer rods extending through the rear chambers, the front chambers communicating with the membrane means, and the rear chambers being connected together and communicating with the expansion chamber of the feed cylinder, (b) recirculating conduit means, and transfer conduit means valve means cooperating with each recirculating cylinder to direct concentrate fluid from the front chamber to the membranes on a pumping stroke of the recirculating cylinder, and to direct concentrate fluid from the rear chamber to the front chamber on a return stroke of the recirculating cylinder, (c) the rotatable drive means cooperating with the recirculating displacer rods so that the recirculating cylinders are phased equally from the feed cylinder, (d) the first valve means is connected to the drive means and is phased at a desired phase angle from the feed cylinder, and communicates with the rear chambers of the recirculating cylinders and the expansion chamber of the feed cylinder.

20. A pumping apparatus as claimed in claim 19 in which the return conduit means includes:

(a) first intermediate concentrate conduit means extending between the rear chambers of the recirculating cylinders and the first valve means so that the first valve means communicates with at least one rear chamber of the recirculating cylinders, (b) second intermediate concentrate conduit means extending from the first valve means to the expansion chamber of the feed cylinder to direct concentrate fluid to and from the expansion chamber of the feed cylinder.

21. A pumping apparatus as claimed in claim 20 in which the first valve means is further characterized by:

(a) a valve spool and a valve chamber communicating with a rear chamber of a recirculating cylinder and the first and second intermediate concentrate conduit means, the valve spool being reciprocable within the valve chamber and connected to the recirculating displacer rod of one of the recirculating cylinders so as to be phased at a desired dwell angle from the actuation of the feed cylinder, so that the first and second intermediate concentrate conduit means connect the rear chamber of the recirculating cylinders with the expansion chamber of the feed cylinder for a pumping stroke of the feed cylinder to direct pressurized concentrate fluid into the expansion chamber, and the second intermediate conduit means connects the expansion chamber to exhaust for an induction stroke of the feed cylinder to exhaust depressurized concentrate fluid.

22. A pumping apparatus as claimed in claim 19 further characterized by:

(a) the recirculating displacer rods of the recirculating cylinders each having displacements of about one half of the displacement of the feed displacer rod of the feed cylinder.

23. A pumping apparatus as claimed in claim 19 further characterized by:
   (a) the recirculating conduit means extending from the forward chambers of the recirculating cylinders to the membrane means, with the recirculating valve means provided in the recirculating conduits,
   (b) the transfer conduits extending from the forward chambers to the rear chambers of the recirculating cylinders with the transfer valve means in the transfer conduits.

24. A pumping apparatus as claimed in claim 23 or 17 further characterized by:
   (a) the recirculating and transfer valves are pressure responsive check valves.

25. Pumping apparatus as claimed in claim 1 in which the means to reduce fluctuations in fluid flow and pressure across the membranes includes:
   (a) a differential surge absorber means communicating with the outfeed and return conduit means and interposed between the membrane means and the first and second valve means to absorb pressure fluctuations in the feed fluid flow.

26. Pumping apparatus as claimed in claim 25 in which:
   (a) the differential surge absorber is a cylinder and a piston means, the piston means being spring-loaded and double-acting and reciprocable with the cylinder, the cylinder and piston means of the differential surge absorber being of similar proportions to the feed cylinder and feed displacer rod of the feed pump means but having a displacement several times greater.

27. Pumping apparatus as claimed in claim 25 in which the differential surge absorber is characterized by:
   (a) a cylinder and a piston means, the piston means dividing the cylinder into a concentrate surge absorber chamber and a feed surge absorber chamber, the feed surge absorber chamber being exposed to pressurized feed fluid in the outfeed conduit means and the concentrate surge absorber chamber being exposed to the concentrate fluid fraction in the return conduit means,
   (b) the piston means cooperates with a piston rod means extending through the concentrate surge absorber chamber with sealing means to seal the surge absorber against leakage,
   (c) spring means cooperating with the piston means to force the piston in a direction to exhaust the feed surge absorber chamber.

28. Pumping apparatus as claimed in claim 27 in which the piston means of the differential surge absorber is characterized by:
   (a) a flexible diaphragm means attached to the piston rod means and separating the feed surge absorber chamber from the concentrate surge absorber chamber.

29. Pumping apparatus as claimed in claim 1 in which:
   (a) the first valve means is a two-position, center-closed three-way valve having a movable spool, the spool having a closed center and being adapted to travel between the two positions.

30. Pumping apparatus as claimed in claim 1 in which the first valve means is characterized by:
   (a) a cam means cooperating with the rotatable drive means,
   (b) a pair of normally-closed, two-way poppet valves to close respective conduit means, the poppet valves being unseated and opened by the cam means, the cam means being adapted to unseat and open one poppet valve whilst leaving the remaining poppet valve seated and closed.

31. A method of membrane separation of a feed fluid into permeate fluid and concentrate fluid fractions which are respectively permeated and rejected by selective membrane means, the membrane means being exposed to pressurized feed fluid supplied by a reciprocating feed pump means having a feed cylinder, a feed displacer and a feed displacer rod, the displacer dividing the cylinder into a pumping chamber in which feed fluid is pressurized and an expansion chamber in which concentrate fluid is depressurized, valve means in conduit means associated with the chambers determining fluid flow directions to and from the membrane means, the method being characterized by steps of:
   (a) as the displacer rod initiates an induction stroke, permitting yielding between portions of the displacer and the displacer rod so that there is relative movement therebetween,
   (b) whilst inducting feed fluid into the pumping chamber, simultaneously exhausting depressurized concentrate fluid from the expansion chamber,
   (c) after the end of the induction stroke of the feed displacer, shifting the valve means across a closed intermediate position thereof during an interval of zero fluid transfer from the cylinder by the displacer, and when pressure difference across the valve means is relatively low,
   (d) as a displacer rod initiates a pumping stroke, permitting yielding between portions of the displacer and the diplacer rod so that there is relative movement therebetween,
   (e) whilst pressurizing feed fluid in the pumping chamber to force the pressurized feed fluid to the membrane means, simultaneously admitting into the expansion chamber pressurized concentrate fluid fraction from the membrane means to depressurize the concentrate fluid fraction to supplement energy supplied to the feed displacer in the pumping stroke, so that pressure differences across the displacer are relatively low,
   (f) after the end of the pumping stroke of the feed displacer, shifting the valve means during an interval of zero fluid transfer in the expansion chamber and when pressure difference across the valve means is relatively low.

32. A method as claimed in claim 31 further characterized by:
   (a) upon initiation of an induction stroke and upon initiation of a pumping stroke, simultaneously permitting limited intermixing across the feed displacer of fluid in the expansion and pump chambers.

33. A method as claimed in claim 31 further characterized by:
   (a) pumping concentrate fluid across the membranes from a recirculating cylinder coupled to the feed pump means, the recirculating cylinder being phased equally apart from the feed cylinder,
so that a recirculating pulse of re-cycled concentrate fluid is phased equally from a main pulse of feed fluid so as to reduce fluid pressure and flow fluctuations across the membranes and to reduce fluctuations in the torque requirements for the drive means.

34. A method as claimed in claim 31 further characterized by:
(a) pumping concentrate fluid across the membranes from a pair of recirculating cylinders coupled to the feed cylinder means, the recirculating cylinders being phased equally apart from the feed cylinder and from each other, so that two recirculation pulses of recycled concentrate fluid are phased equally from each main pulse of feed fluid so as to smooth fluid pressure and flow fluctuations across the membranes and to reduce fluctuations in the torque requirements for the drive means.

* * * * *